(12) United States Patent
Poh

(10) Patent No.: US 11,711,216 B1
(45) Date of Patent: Jul. 25, 2023

(54) SYSTEMS AND METHODS FOR PRIVACY-SECURED BIOMETRIC IDENTIFICATION AND VERIFICATION

(71) Applicant: T Stamp Inc., Atlanta, GA (US)

(72) Inventor: Norman Hoon Thian Poh, Atlanta, GA (US)

(73) Assignee: T STAMP INC., Atlanta, GA (US)

( * ) Notice: Subject to any disclaimer, the term of this patent is extended or adjusted under 35 U.S.C. 154(b) by 232 days.

(21) Appl. No.: 17/109,693

(22) Filed: Dec. 2, 2020

Related U.S. Application Data

(60) Provisional application No. 62/942,311, filed on Dec. 2, 2019.

(51) Int. Cl.
  *H04L 9/32* (2006.01)
  *G06F 21/62* (2013.01)
  *G06F 21/32* (2013.01)

(52) U.S. Cl.
  CPC ............ *H04L 9/3231* (2013.01); *G06F 21/32* (2013.01); *G06F 21/6245* (2013.01)

(58) Field of Classification Search
  None
  See application file for complete search history.

(56) References Cited

U.S. PATENT DOCUMENTS

| | | | |
|---|---|---|---|
| 11,151,288 B2 * | 10/2021 | An | G06F 21/74 |
| 2009/0022374 A1 * | 1/2009 | Boult | H04L 9/3234 |
| | | | 382/119 |
| 2009/0122979 A1 * | 5/2009 | Lee | G06K 9/6277 |
| | | | 707/999.006 |
| 2009/0287930 A1 * | 11/2009 | Nagaraja | H04L 9/3231 |
| | | | 380/255 |
| 2013/0243328 A1 * | 9/2013 | Irie | G06V 40/50 |
| | | | 382/192 |
| 2015/0269394 A1 * | 9/2015 | Bringer | H04L 63/0861 |
| | | | 726/26 |

FOREIGN PATENT DOCUMENTS

| | | | | | |
|---|---|---|---|---|---|
| WO | WO-2009073144 A2 | * | 6/2009 | ............ | G06F 21/32 |
| WO | WO-2017172314 A1 | * | 10/2017 | ........... | G11C 11/419 |

* cited by examiner

*Primary Examiner* — Benjamin E Lanier
(74) *Attorney, Agent, or Firm* — Morris, Manning & Martin, LLP; Daniel E. Sineway, Esq.; Daniel T. Begasse

(57) ABSTRACT

A biometric enrollment system can include a processor and a data store that stores one or more TPS templates and a sample population. The processor can be configured to receive a reference template associated with a subject, generate a cohort set based on a plurality of templates from the sample population, and perform a one-to-many comparison process on the reference template and the cohort set, wherein an output of the one-to-many comparison process comprises one or more cohort vectors. The processor can normalize the one or more cohort vectors to obtain one or more normalized cohort vectors, and can apply a lossy transformation to the one or more normalized cohort vectors. An output of applying the lossy transformation can comprise one or more transformed, privacy-secured (TPS) templates that are stored in the database.

15 Claims, 10 Drawing Sheets

SYSTEMS AND METHODS FOR PRIVACY-SECURED BIOMETRIC IDENTIFICATION AND VERIFICATION

CROSS-REFERENCE TO RELATED APPLICATION

This application claims the benefit of and priority to U.S. Patent Application No. 62/942,311, filed Dec. 2, 2020, titled "SYSTEMS AND METHODS FOR PRIVACY-SECURED BIOMETRIC IDENTIFICATION AND VERIFICATION," which is incorporated herein by reference in its entirety.

TECHNICAL FIELD

The present disclosure relates generally to privacy-secured biometric enrollment, identification, and verification.

BACKGROUND

Although biometrics can be used to uniquely identify an individual, biometric templates used therein can be a vulnerable point of attack because original biometric templates cannot be reissued or replaced (unlike security tokens or passwords). Previous approaches to securing biometric templates typically utilized techniques to obfuscate original templates and create secondary templates derived therefrom, thereby increasing the technical barriers to reconstructing the irreplaceable original biometric templates. For example, previous solutions typically apply lossless transformation techniques to original biometric templates to create secondary templates. Previous solutions commonly utilize lossless transformation techniques, because the techniques result in zero loss of information between the original templates and the secondary templates derived therefrom, thereby improving matching accuracy. However, because the secondary template contains all information from the original template (albeit in different format), it is still technically feasible for an attacker to reverse the transformation and reconstruct the original template.

As described above, lossless transformation techniques preserve accuracy at the cost of security; therefore, in contrast, lossy transformation techniques compromise accuracy to improve security. In previous approaches, accuracy losses may be intolerably high, and thus use of lossy transformation techniques may be infeasible. For example, in either transformation technique, any biometric template that varies in size (for example, a template of fingerprint minutiae) must be translated into a fixed size vector first. Transformation from variable to fixed size is an extremely challenging problem because the process of translation from a variable-length template to a fixed-size template invariably results in a significant drop in accuracy, and such drops in accuracy are exacerbated in lossy transformation techniques.

Therefore, there is a long-felt, but unresolved need for a system or method that can transform size-variant, personally-identifying biometric templates into fixed-size, privacy-secured templates, while maintaining accurate biometric matching capabilities.

BRIEF SUMMARY OF THE DISCLOSURE

Briefly described, and according to one embodiment, aspects of the present disclosure generally relate to biometrics, in particular to the generation and verification of privacy-secured, irreversibly-transformed biometric representations.

In various embodiments, the present systems and methods provide techniques for applying transformations to biometric templates to generate abstracted templates for use in biometrics matching processes. In at least one embodiment, the present systems and methods utilize lossy feature transformation techniques to address biometric template irreplaceability by applying irreversible lossy transformations to an original biometric template, thereby rendering the resultant biometric template incapable of being used to reconstruct the original biometric template and obtain personally-identifying information (PII). In at least one embodiment, privacy-preserving algorithms and techniques can be used, such as irreversible and/or lossy transformations, to turn a native biometric template into a new domain that is non-personally-identifying, accurate, efficient to compare, and compact in terms of template size.

In various embodiments, the present systems and methods may provide for improved biometric security and privacy. According to one embodiment, outputs of the present systems and methods (e.g., TPS templates or $(IT)^2$ tokens) cannot be used to reconstruct the original biometric samples from which they were derived. For example, if an attacker obtained a TPS template described herein, the attacker would be unable to reconstruct the original biometric sample from which the TPS template was sourced, because the EGH transform used to create the TPS template results in irreversible loss of information.

In an exemplary scenario, a TPS template is generated by generating a cohort vector based on a one-to-many comparison between a probe biometric template and a set of cohort templates, normalizing the cohort vector, and irreversibly and lossily transforming the normalized cohort vector into the TPS template. In this scenario the attacker would be unable to revert the TPS template into a precursor data object (e.g., a normalized cohort vector), and thus would be unable to generate, access, or view the probe biometric template. Furthermore, even if the attacker were able to achieve the impossible reversion of the TPS template and generate, access, or view the normalized cohort vector, the attacker would still be unable to generate, access, or view the probe biometric template, because the attacker would not possess the set of cohort templates that were used to generate the original normalized cohort vector. In the same scenario, the set of cohort templates may be stored in encrypted binary files housed in one or more secure databases; therefore, even if the attacker accessed or viewed the cohort template files, the attacker would be unable to generate, access, or view the cohort templates due to their encrypted format. Continuing the scenario, if the attacker were able to decrypt the cohort template files and access or view the set of cohort templates, the attacker would still need to be capable of reading and understanding the cohort templates in the associated vendor's proprietary format. One of ordinary skill will appreciate the immensely difficult computational and mathematical problems associated with interpreting the proprietary format and accurately reconstructing the probe biometric template associated therewith.

In summary, each step performed by the present systems and methods to produce transformed templates adds compounding difficulty to processes required to reverse the transformed templates and generate/access/view an original biometric template sample. Furthermore, in some embodiments, the present systems and methods include techniques, such as irreversible transformation that render transformed biometric templates impossible to reverse with 100% fidelity. Thus, even if an attacker were able to reconstruct an original template, the reconstructed original template would not be sufficiently accurate to deceive a biometrics liveness detection algorithm because of its poor resemblance to real biometric samples.

According to a first aspect, a method for biometric enrollment comprising: A) receiving at least one probe template associated with a subject; B) generating a cohort set based on a plurality of templates from a sample population; C) performing a one-to-many comparison process on the at least one probe template and the cohort set to generate one or more cohort vectors; D) normalizing the one or more cohort vectors; and E) applying a lossy transformation to the one or more normalized cohort vectors to generate one or more transformed, privacy-secured (TPS) templates.

According to a further aspect, the method of the first aspect or any other aspect, wherein the sample population excludes a target population comprising the subject.

According to a further aspect, the method of the first aspect or any other aspect, wherein the sample population comprises artificial templates.

According to a further aspect, the method of the first aspect or any other aspect, further comprising generating the artificial templates based on a pseudo-random noise vector.

According to a further aspect, the method of the first aspect or any other aspect, further comprising: A) computing a discrimination ratio for each of the plurality of templates; B) ranking the plurality of templates based on the discrimination ratios; and C) generating the cohort set by selecting a subset of top-ranked templates from the sample population.

According to a further aspect, the method of the first aspect or any other aspect, wherein the discrimination ratio is a ratio of in-class variance to between class variance.

According to a further aspect, the method of the first aspect or any other aspect, wherein: A) the discrimination ratio is defined by:

$$c = \frac{E_u[(\mu_u^c - \mu^c)^2]}{E_u(E_{y \in Y_u^c}[(y - \mu_u^c)^2])};$$

and B) c is the discrimination ratio of the template, u is the subject, $\mu^c$ is a global mean cohort value, $\mu_u^c$ is a mean cohort value due based on comparing all of the subject u's samples to cohort sample c, Y is a matrix of cohort scores from the one-to-many comparison process, $E_u[\bullet]$ is an expectation operator over the plurality of templates, and $E_{y \in Y_u^c}[\bullet]$ is an expectation operator over the plurality of templates based on comparing all of the subject u's samples to cohort sample c.

According to a further aspect, the method of the first aspect or any other aspect, wherein the lossy transformation is an Evergreen hash transformation.

According to a second aspect, a method for biometric verification, comprising: A) receiving input data comprising an identifier and a probe template associated with a subject; B) generating a TPS probe template based on the probe template; C) retrieving at least one reference TPS template associated with the identifier; D) performing a one-to-one comparison between the TPS probe template and the at least one reference template; E) based on the one-to-one comparison, determining that the TPS probe template matches the at least one reference TPS template; and F) based on the determination, verifying an identity of the subject.

According to a further aspect, the method of the second aspect or any other aspect, wherein: A) an output of the one-to-one comparison comprises at least one distance score; and B) determining that the TPS probe template matches the at least one reference comprises determining that the at least one distance score meets a predefined distance threshold.

According to a further aspect, the method of the second aspect or any other aspect, further comprising: A) retrieving a plurality of reference templates associated with the identifier; B) performing a one-to-one comparison between the probe template and each of the plurality of reference templates to generate a plurality of distance scores; C) computing a mean distance score based on the plurality of distance scores; D) comparing the mean distance score to a predefined distance threshold; and E) verifying the identity of the subject based on a determination that the mean distance score meets the predefined distance threshold.

According to a further aspect, the method of the second aspect or any other aspect, further comprising causing a lock to disengage.

According to a further aspect, the method of the second aspect or any other aspect, further comprising providing access to a computing environment.

According to a third aspect, a method for identifying a subject in a population, comprising: A) receiving input data comprising an identifier and at probe template associated with a subject; B) generating a TPS probe template based on the probe template; C) performing a one-to-many comparison between the TPS probe template and a plurality of templates from a template population that is associated with the subject; D) based on the one-to-many comparison, determining that the TPS probe template matches one of the plurality of templates; and E) based on the determination, positively identifying the subject based on the determination.

According to a further aspect, the method of the third aspect or any other aspect, wherein: A) performing the one-to-many comparison comprises computing a distance score for each of the plurality of templates; and B) determining that the TPS probe template matches one of the plurality of templates comprises: 1) ranking the plurality of templates based on the distance scores, wherein the one of the plurality of templates is the top-ranked template; and 2) determining that the TPS probe template matches the one of the plurality of templates based on a determination that the distance score of the one of the plurality of templates meets a predefined distance threshold.

According to a further aspect, the method of the third aspect or any other aspect, wherein: A) the plurality of templates comprises a plurality of mated template sets; and B) determining that the TPS probe template matches one of the plurality of templates comprises: 1) computing a mated distance score for each of the plurality of mated template sets; 2) ranking the plurality of mated template sets based on the mated distance scores, wherein a top-ranked mated template set comprises the one of the plurality of templates; and 3) determining that the mated distance score of the top-ranked mated template set meets a predefined distance threshold.

According to a further aspect, the method of the third aspect or any other aspect, wherein the mated distance score is a mean distance score computed from the distance scores of the plurality templates in the mated template set.

According to a further aspect, the method of the third aspect or any other aspect, wherein the mated distance score is a minimum distance score selected from the plurality of distance scores of the plurality of templates in the mated template set.

According to a further aspect, the method of the third aspect or any other aspect, further comprising, in response to positively identifying the subject, causing a lock to disengage.

According to a fourth aspect, a biometric enrollment system comprising a processor configured to: A) receive at least one probe template associated with a subject; B) generate a cohort set based on a plurality of templates from a sample population; C) perform a one-to-many comparison process on the at least one probe template and the cohort set to generate one or more cohort vectors; D) normalize the one or more cohort vectors; and E) apply a lossy transformation to the one or more normalized cohort vectors to generate one or more transformed, privacy-secured (TPS) templates.

These and other aspects, features, and benefits of the disclosure will become apparent from the following detailed written description of the preferred embodiments and aspects taken in conjunction with the following drawings, although variations and modifications thereto may be effected without departing from the spirit and scope of the novel concepts of the disclosure.

BRIEF DESCRIPTION OF THE FIGURES

The accompanying drawings illustrate one or more embodiments and/or aspects of the disclosure and, together with the written description, serve to explain the principles of the disclosure. Wherever possible, the same reference numbers are used throughout the drawings to refer to the same or like elements of an embodiment, and wherein.

DETAILED DESCRIPTION

Figure 1:
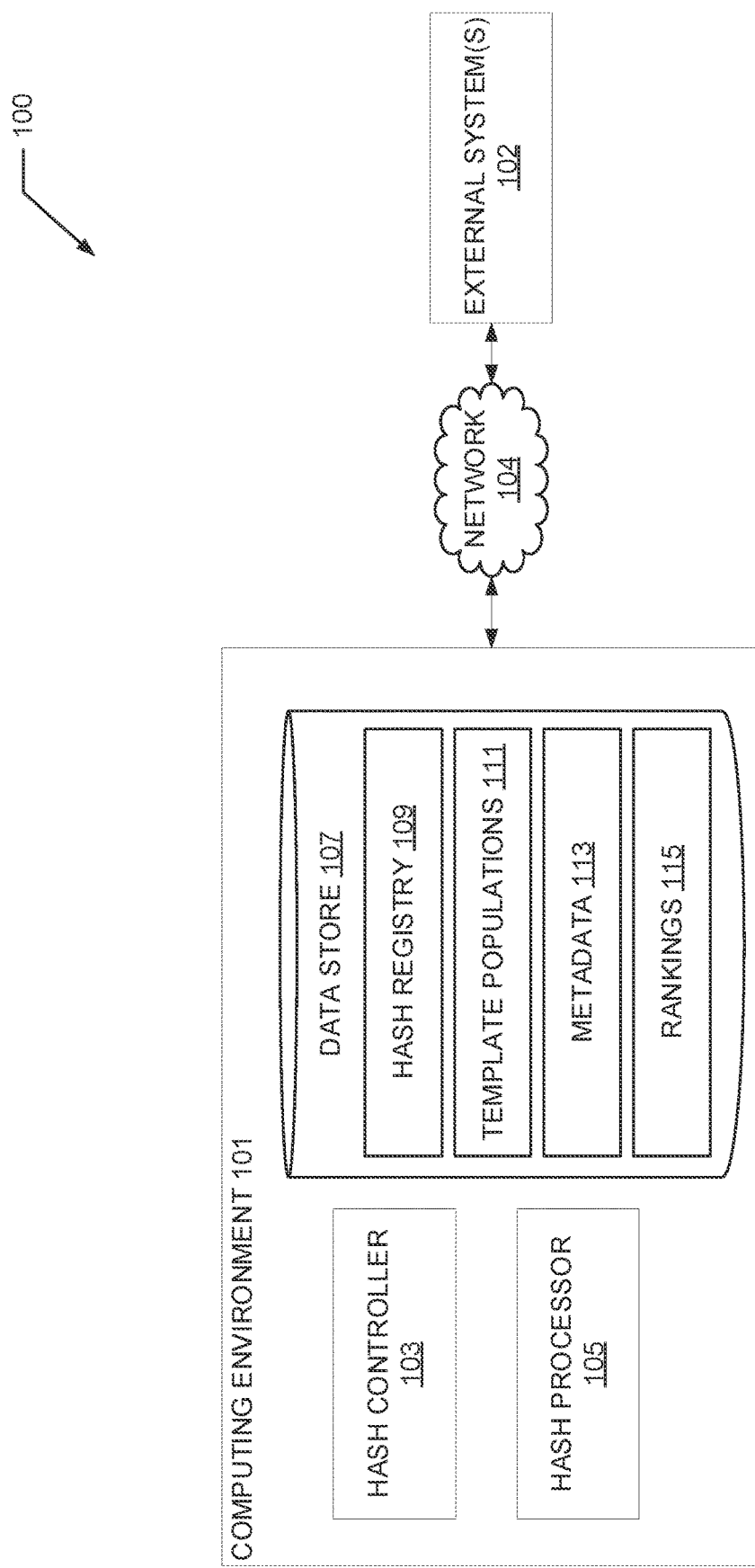
FIG. 1 shows an exemplary biometric system, according to one embodiment of the present disclosure.

For the purpose of promoting an understanding of the principles of the present disclosure, reference will now be made to the embodiments illustrated in the drawings and specific language will be used to describe the same. It will, nevertheless, be understood that no limitation of the scope of the disclosure is thereby intended; any alterations and further modifications of the described or illustrated embodiments, and any further applications of the principles of the disclosure as illustrated therein are contemplated as would normally occur to one skilled in the art to which the disclosure relates. All limitations of scope should be determined in accordance with and as expressed in the claims.

As used herein, "biometric template" generally refers to an electronic representation (e.g., data object(s)) of biometric signatures sourced from biometric sources including, but not limited to, facial scans, palm scans, fingerprints, retinal scans, sounds, and signals, among others. Thus, the present biometric sources are not limited to physical or behavioral sources, but may include any source that produces data suitable for representation via a set of unrelated data objects.

As used herein, "transformed, privacy-secured (TPS) template" generally refers to a transformed biometric template generated by applying one or more transformation to an original template to create a transformed biometric template that obfuscates the original data of the original template. In at least one embodiment, a TPS template may be a biohash or an irreversibly transformed identity token (($IT)^2$ token), that can be used in place of a source biometric template in biometrics matching processes for verifying or uniquely identifying individuals. In the present disclosure the terms TPS template, biohash, and $(IT)^2$ token may be used interchangeably.

As used herein, "irreversible transform" generally refers to one or more algorithms or other techniques that are applied to a first data object and generate a second data object, which contains less information than the first data object such that the second data object cannot be reverse-transformed to recover the first data object. An irreversible transform may be performed according to one or more embodiments as described in U.S. patent application Ser. No. 16/406,978, filed May 8, 2019, entitled "SYSTEMS AND METHODS FOR ENHANCED HASH TRANSFORMATIONS," which claims the benefit of and priority under: U.S. Application No. 62/829,825, filed Apr. 5, 2019, entitled "EVERGREEN HASH"; and U.S. Application No. 62/668,576, filed May 5, 2018, entitled "THE EVERGREEN HASH," all of which are incorporated herein by reference as if fully set forth in their entireties.

As used herein, a "distance score" generally refers to a Euclidean distance or $L^2$ norm metric. In various embodiments, both formulas result in substantially identical matching performance due to the use of normalized cohort vectors. According to one embodiment, in cases where transformed, privacy-secured templates are used, the matching performance may be substantially similar. In either case, it will be understood and appreciated that one or more embodiments of the present system may use one or more algorithms or optimization techniques to support computational efficiency and improve matching speed.

In at least one embodiment, the process of transforming an original biometric scan into a derived biometric template is referred to as "feature representation." In the present system, feature representation may be achieved by performing one or more comparisons. According to various embodiments, the present system may utilize one-to-many comparison techniques, which involve comparing a probe sample to a set of cohort templates to produce a set of similarity scores. The one-to-many technique may quantify comparisons by calculating, between the probe sample and each (stored or other reference) template, a Euclidean distance or an $L^2$ norm metric. While the exact computation for each metric varies, each metric may result in identical biometric matching performance because normalized cohort vectors can be generated from metrics produced in either approach. In one example, the set of similarity scores are used as a representation of the probe template and are further transformed into a TPS template (e.g., by a lossy transformation technique) to further increase security and privacy. In another example, the set of similarity scores are used to identify the subject associated with the probe template (e.g., a highest-scoring cohort template being identified as representing the subject). In various embodiments, the present system may implement one or more algorithmic techniques, such as cohort selection algorithms, to increase computational efficiency of one-to-many comparison processes, which may be desirable, for example, in instances where large databases (e.g., in excess of one million subjects) are processed.

Overview

Aspects of the present disclosure generally relate to systems and methods for generating and processing biometrics data.

A biometric template may be generated, or encoded, from an image of a person's face or other features, including, but not limited to, palm, fingerprint, and iris, among others. Characteristics of the person's face (or other feature) may be identified via techniques such as convolutional neural networks, and those characteristics may be encoded and included in a variable or fixed-size vector (or similar data object). Biometric templates are generally not replaceable in instances of theft, because biometric templates are sourced from static human features. Thus, when theft of a biometric template does occur, the theft constitutes irrecoverable loss of irreplaceable, personally identifying information (PII). The present system may reduce the risk of biometric theft resulting in the loss of irreplaceable, personally identifying information by replacing original biometric templates with transformed, privacy-secured (TPS) templates. For example, an embodiment of the system can transform any original biometric template (whether of fixed or variable length) into a TPS template for use in place of the original biometric template during biometrics matching processes. The TPS template may be derived from a one-to-many comparison process described herein, and the TPS template may include only non-PII. In various embodiments, the TPS templates, biohashes, $(IT)^2$ tokens, and other technology described herein can be readily integrated into native biometric matching systems, thereby providing accurate and efficient biometric matching processes, while reducing privacy and security risks posed thereby.

In a first scenario, a biometric matcher determines identity matches by making comparisons between a probe facial template and one or more stored facial templates. In the first scenario, were theft of the probe template to occur, the theft would constitute loss of irreplaceable, personally-identifying information, because the raw facial template would be readily obtainable.

In an alternative scenario, the biometric matcher, upon implementing the present technology, determines matches by making comparisons between a probe TPS template (a non-sensitive personally identifying and irreversible transformation of the probe facial template) and one or more stored TPS templates. Were theft of the probe TPS template to occur in the alternative scenario, the theft would not constitute loss of irreplaceable, personally-identifying information, because the raw facial data would not be obtainable due to the irreversible loss of information that occurred while generating the probe TPS template.

While previous privacy-preserving biometric solutions are dependent upon the specific biometric matching modality being used, embodiments of the present systems and methods are modality-agnostic, which advantageously allows for implementation into a wide variety of native biometric solutions. Furthermore, during matching and feature extraction, previous privacy-preserving biometric solutions access feature-level information that is often proprietary and/or concealed within a vendor's software development kit (SDK), thereby requiring additional steps and exchanges to perform template generation and/or matching processes. In contrast, the present systems and methods do not require the feature-level information and, thus, can work directly with any vendor's SDK without expending time and computing resources on the additional steps and exchanges required of previous approaches. Furthermore, previous solutions to template transformation have demonstrated transformed templates with significantly degraded accuracy. In contrast, the present systems and methods may mitigate the accuracy reductions of template transformation by utilizing multiple templates.

In addition, because the present systems and methods do not need to access a vendor's template directly, the systems and methods may be utilized with biometric templates of any format, whether proprietary or based on open standards such as, for example, ISO, Interpol or NIST formats. Finally, previous solutions to template transformation require storage of original templates or features thereof, for example, via obfuscation (e.g., feature permutation) and linear transformation (e.g., via noise addition and multiplication). The storage of original templates or features thereof presents an opportunity for theft of PII. In contrast, the present systems and methods do not require storage of the original templates or template features, and thus do not present an opportunity for theft of PII, because original templates and features thereof are never stored (e.g., apart from momentary storage in a cache during initial processing steps described herein), but are instead represented via irreversible, non-personally-identifying templates (e.g., irreversibly transformed identity tokens).

Embodiments of the present system may be implemented in any native biometric solution of any biometric modality and any format, proprietary or not, that can perform one-to-many comparison at speed and scale. In at least one embodiment, the present system may be implemented in any biometric solution that includes a native biometric matcher demonstrating equal error rate (EER) of less than about 1% (e.g., on publicly available benchmark databases), and that is capable of performing rapid one-to-many comparisons (e.g., 100-500 comparisons per execution of the present template generation process). In various embodiments, biometric solutions, upon implementation of the present system, may be capable of performing 1:N deduplication at speed and scale, while preserving matching accuracy and complying with personally identifiable information (PII)-related regulations.

Exemplary Embodiments

Referring now to the figures, for the purposes of example and explanation of the fundamental processes and components of the disclosed systems and processes, reference is made to FIG. 1, which illustrates an exemplary template system 100. As will be understood and appreciated, the exemplary template system 100 shown in FIG. 1 represents merely one approach or embodiment of the present system, and other aspects are used according to various embodiments of the present system.

In at least one embodiment, the template system 100 includes a computing environment 101 in communication with one or more external systems 102 over a network 104. The elements of the computing environment 101 can be provided via a plurality of computing devices that may be arranged, for example, in one or more server banks or computer banks or other arrangements. Such computing devices can be located in a single installation or may be distributed among many different geographical locations. For example, the computing environment 101 can include a plurality of computing devices that together may include a hosted computing resource, a grid computing resource, and/or any other distributed computing arrangement. In some cases, the computing environment 101 can correspond to an elastic computing resource where the allotted capacity of processing, network, storage, or other computing-related resources may vary over time.

According to one embodiment, the external system 102 generally refers to systems or computing devices that process, store, and/or perform actions based at least in part on biometric data. In one example, the external system 102 is a biometric security system for controlling access to physical and/or digital environments. In another example, the external system 102 is a software application running on a mobile computing device. In various embodiments, the external system 102 receives biometric data, such as images or other files, and processes the biometric data through a biometric matcher (e.g., according to a particular capture software development kit (SDK) and a particular matcher SDK). The network 104 includes, for example, the Internet, intranets, extranets, wide area networks (WANs), local area networks (LANs), wired networks, wireless networks, or other suitable networks, etc., or any combination of two or more such networks. For example, such networks can include satellite networks, cable networks, Ethernet networks, and other types of networks. In at least one embodiment, the template system 100 accesses one or more application programming interfaces (API) to facilitate communication and interaction between the computing environment 101 and one or more external systems 102.

In one or more embodiments, the computing environment 101 includes one or more hash controllers 103, one or more hash processors 105, and one or more data stores 107. According to one embodiment, the hash controller 103 controls hash and/or template processing, transformation, and communication. In one example, the hash controller 103 receives a native biometric template from an external system 102 and initiates a template generation process (such as the process shown in FIG. 3) to transform the native biometric template into a transformed, privacy-secured (TPS) template. In another example, the hash controller 103 initiates a cohort generation process (e.g., such as the process shown in FIG. 5) to generate cohort sets for use in template generation processes. In one or more embodiments, the hash processor 105 processes native biometric templates and performs transformation techniques to generate TPS templates. In one example, based on a native biometric template the hash processor 105 generates a cohort vector based on a one-to-many comparison process, normalizes the cohort vector, and applies an irreversible, lossy transformation to transform the normalized cohort vector into a TPS template. In at least one embodiment, the hash processor 105 performs one-to-many and one-to-one comparison processes for the purposes of biometric verification or identification. In another example, the hash processor 105 performs a one-to-one comparison process between a probe TPS template and a reference TPS template and generates a similarity score. In the same example, the hash processor 105 compares the similarity score to a predefined threshold and, upon determining the predefined threshold is met, verifies the identity of subject with which the probe TPS template is associated. In some embodiments, the hash processor 105 performs deduplication within one or more system data stores.

In one or more embodiments, the data store 107 stores various information that is used by the template system 100 to execute various processes and functions discussed herein. The data store 107 can be representative of a plurality of data stores as can be appreciated. The data store 107 can include, but is not limited to, one or more hash registries 109, a plurality of template populations 111, metadata 113, and one or more rankings 115. In various embodiments, the hash registry 109 stores irreversible biometric representations, such as TPS templates, and identifiers for associating the representations with one or more subjects or groupings.

In one or more embodiments, the template population 111 includes a plurality of biometric templates (e.g., TPS templates and/or native templates) from which the template system 100 generates datasets (e.g., sets of cohort templates), that are leveraged during template generation processes. According to one embodiment, one or more template populations 111 exclude biometric representations from subjects that are inside of a target population of probe subjects (e.g., subjects whose identity will be determined and/or verified by the template system 100). In some embodiments, a target population with which a subject is associated is referred to as the "gallery." Thus, a set of cohort templates may only include those templates from a template population 111 that are not within the targeted gallery. In some embodiments, the data store 107 includes one or more template populations 111 that are representative of a target population of probe subjects. In one example, the template system 100 is leveraged to perform biometric identification and verification in Kenya, Africa. In this example, a first template population 111 excludes biometric representations from subjects within Kenya, Africa (e.g., the first template population 111 being used to generate sets of cohort templates for biometric enrollment). In the same example, a second template population 111 includes biometric representations from subjects within Kenya, Africa (e.g., the second template population 111 being used to perform one:one and one:many comparisons for biometric verification or identification).

According to one embodiment, the template population 111 includes a plurality of mated and unmated cohort templates. "Mated" cohort templates generally refer to two or more cohort templates that are associated with the same subject, and "non-mated" cohort templates generally refer to two or more cohort templates that are not associated with the same subject. As can be appreciated, the data store 107 can include multiple template populations 111 of varying size and composition. In at least one embodiment, the computing environment 101 generates partially or fully artificial template populations 111 including artificially generated templates that are not associated with a real subject.

In one or more embodiments, metadata 113 includes information related to one or more biometric representations. The metadata 113 can include, but is not limited to, template identifiers that define a connection between a template and a subject, template sources (e.g., a networking address from which a template or other representation is received, an identifier for a particular software development kit that generated a biometric representation, etc.), template metrics, such as historical matching metrics or discrimination ratios, template timestamps that correspond to template generation, verification, or identification events, and one or more labels, such as demographic labels (e.g., subject ethnicity, age, location, etc.) and biometric feature labels (e.g., hand, fingerprint, retina, etc.). In various embodiments, the rankings 115 include rankings of templates based on one or more metrics. In one example, rankings 115 includes a list of templates for potential inclusion in a cohort set (as described herein) that are ordered based on discrimination ratios. In another examples, rankings 115 includes a list of nearest-neighbor templates that are ordered based on similarity scores (e.g., a measure of similarity between each template and a probe template).

Figure 2A:
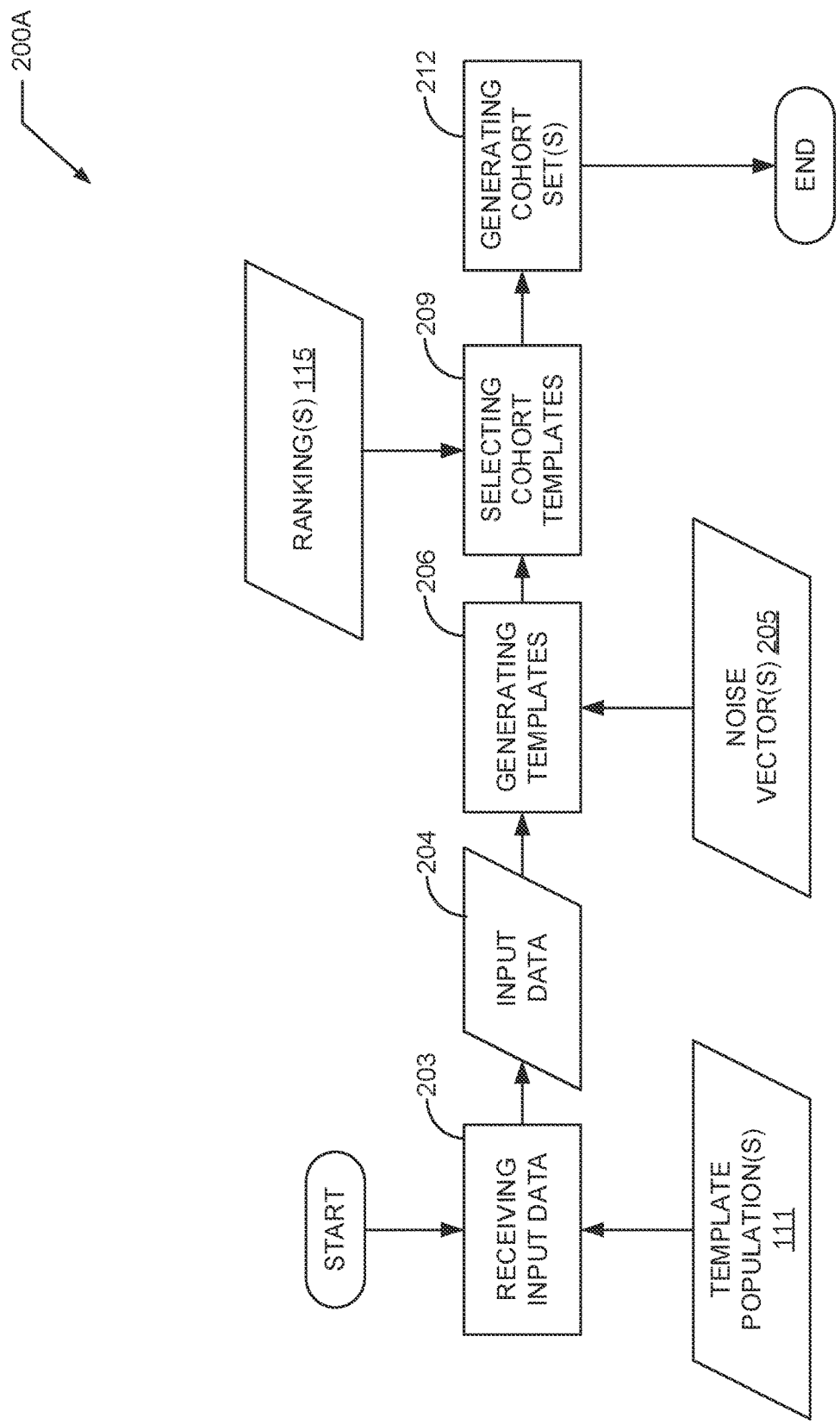
FIG. 2A shows an exemplary cohort generation process, according to one embodiment of the present disclosure.
Figure 2B:
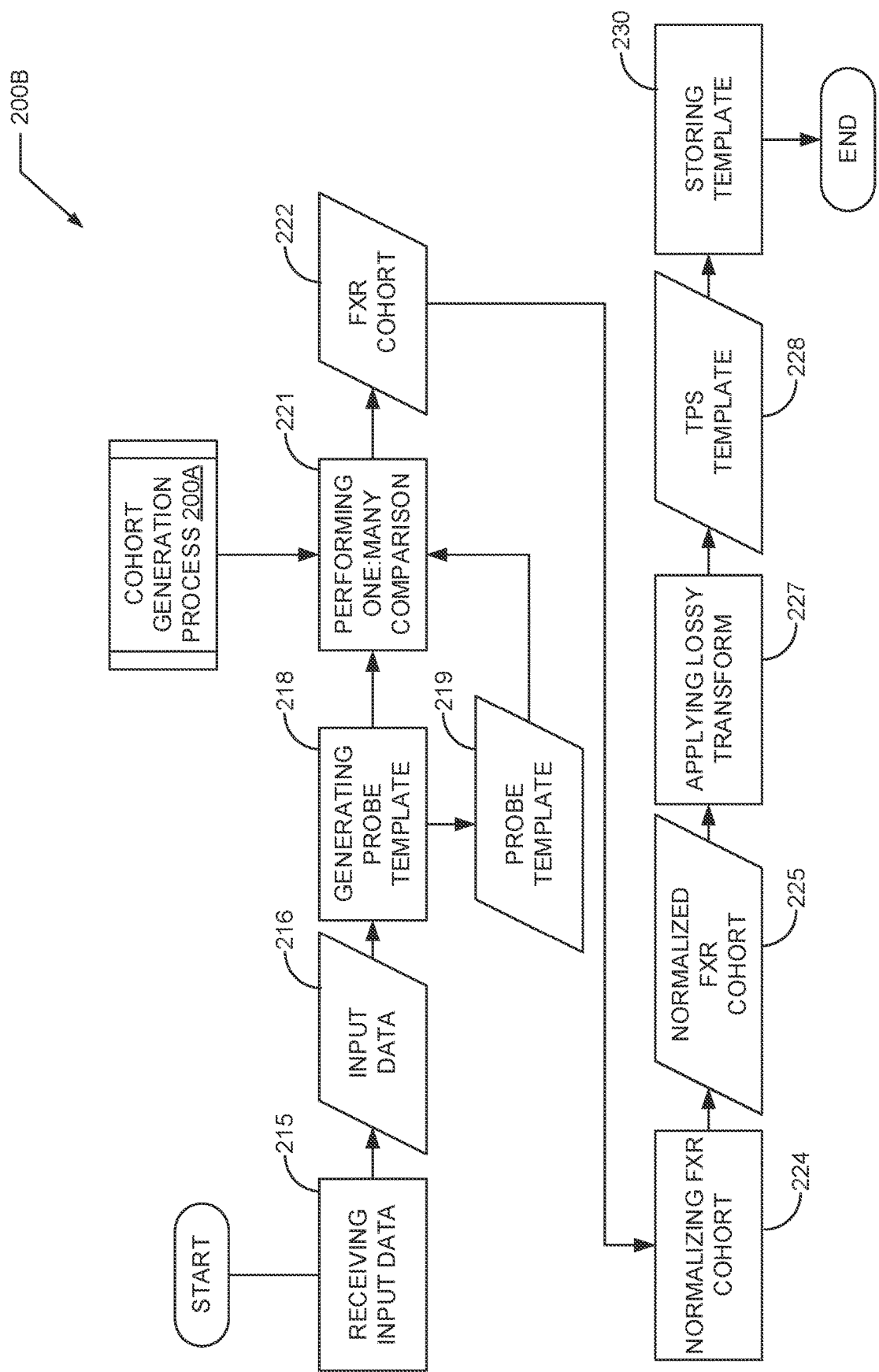
FIG. 2B shows an exemplary biometric enrollment process, according to one embodiment of the present disclosure.
Figure 3:
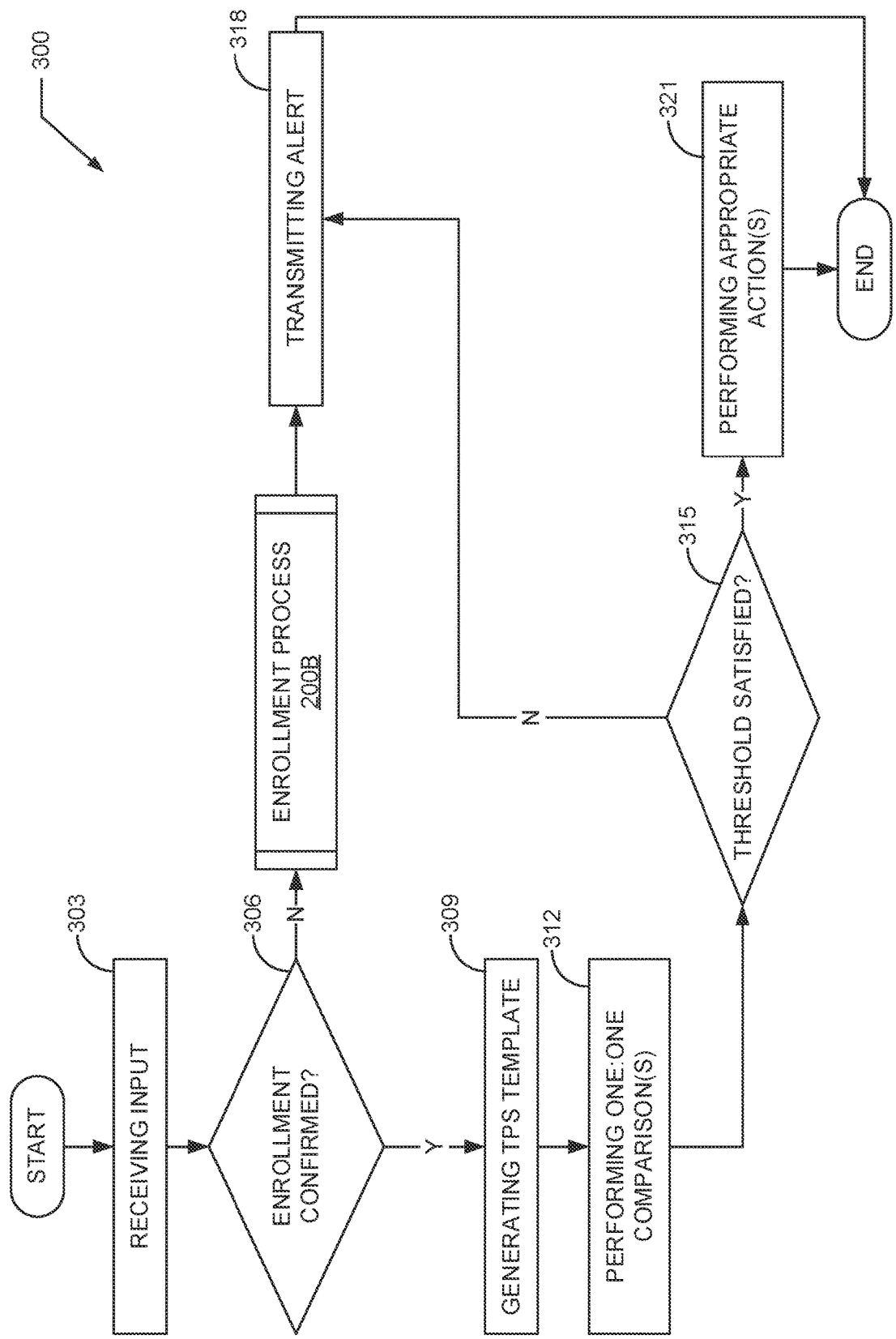
FIG. 3 is a flowchart of an exemplary biometric verification process, according to one embodiment of the present disclosure.
Figure 4:
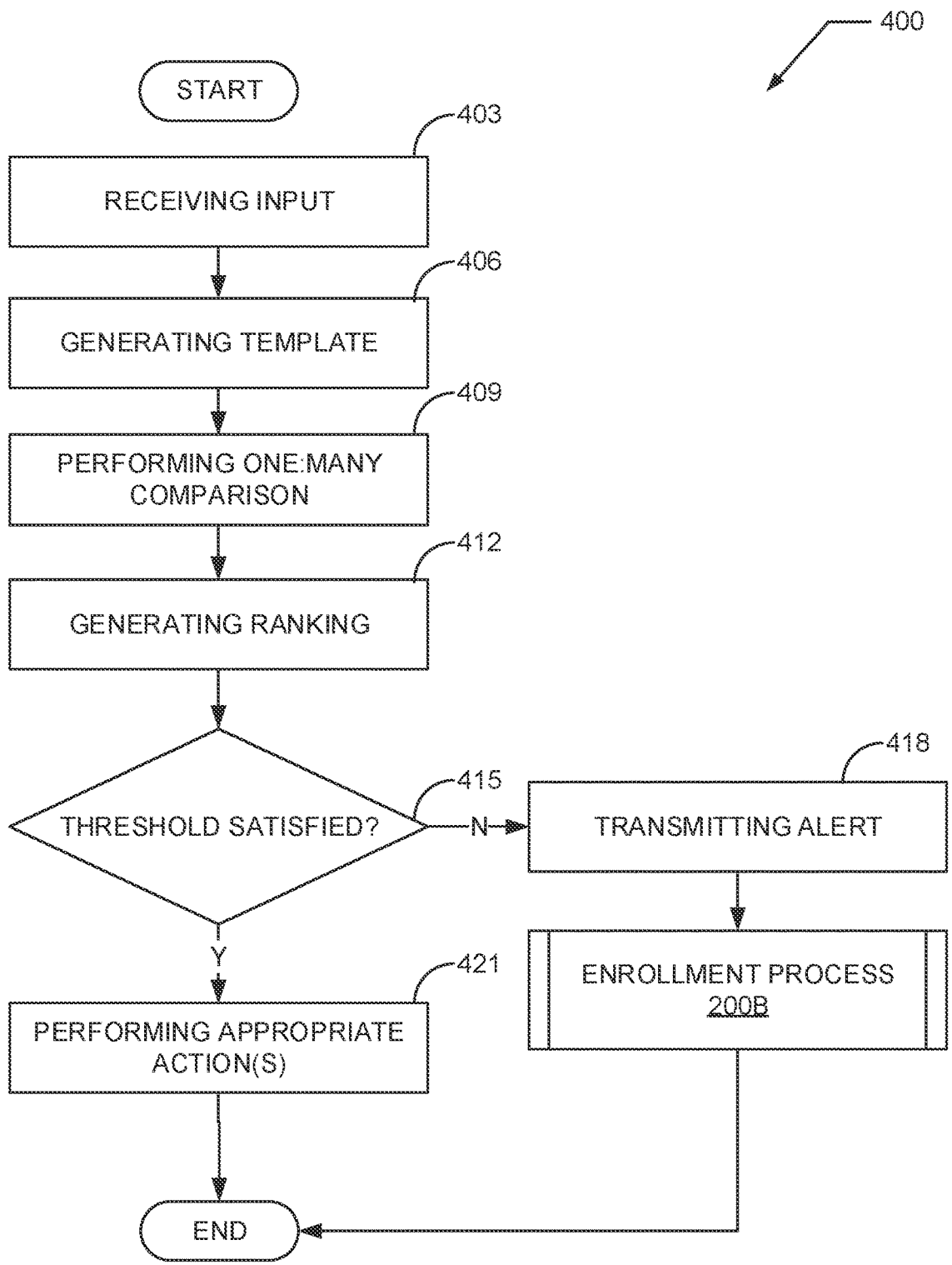
FIG. 4 is a flowchart of an exemplary biometric identification process, according to one embodiment of the present disclosure.

Before turning to the process flow diagrams of FIGS. 2-4, it is noted that embodiments described herein may be practiced using an alternative order of the steps illustrated in any of the FIGS. 2-4. That is, the process flows illustrated in FIGS. 2-4 are provided as examples only, and the embodiments may be practiced using process flows that differ from those illustrated. Additionally, it is noted that not all steps are required in every embodiment. In other words, one or more of the steps may be omitted or replaced, without departing from the spirit and scope of the embodiments. Further, steps may be performed in different orders, in parallel with one another, or omitted entirely, and/or certain additional steps may be performed without departing from the scope of the embodiments.

FIG. 2A shows an exemplary cohort generation process 200A, according to one embodiment of the present disclosure. In various embodiments, the final output of the process 200A includes one or more sets of cohort templates (e.g., for use in biometric enrollment processes, such as the biometric enrollment process 200B).

At step 203, the process 200A includes receiving input data 204. The input data 204 can include, but is not limited to, biometric data of a representative target population. In one example, the input data 204 includes biometric representations (e.g., facial images, fingerprint scans, etc.) from a plurality of subjects. In another example, the input data 204 includes templates retrieved from one or more template populations 111. In at least one embodiment, the input data 204 includes mated and non-mated biometric templates. In one example, for each subject represented, the input data 204 includes two or more biometric templates with which the subject is associated (e.g., though any number of biometric templates may be used). In some embodiments, the input data 204 includes a request or command to generate synthetic cohort templates (e.g., at step 206).

At step 206, the process 200A includes generating a plurality of templates based on the input data 204. In various embodiments, generating the plurality of templates includes processing the input data 204 through a biometric capture SDK. In one example, the input data 204 includes a plurality of facial images from a representative target population. In this example, the template system 100 processes each of the plurality of facial images through a biometric capture SDK to generate a biometric template.

In at least one embodiment, the template system 100 generates the plurality of templates by generating a synthetic template population 111. According to one embodiment, the synthetic template population 111 includes artificial templates (e.g., also referred to as "synthetic templates") that do not represent any real person. In various embodiments, artificial template generation can advantageously generate any variety of template populations 111 and sets of cohort templates to provide a sufficient diversity of cohort templates to represent a target template. According to one embodiment, by interchanging or replacing sets of cohort templates with other cohort template sets, entirely different normalized cohort representations can be created. In at least one embodiment, cohort template replacement and reconfiguration enables any stolen or compromised cohort vector to be revoked and a new one reissued in infinite combinations.

In one or more embodiments, generating a synthetic template population 111 includes generating a noise vector 205 for use an input parameter to a data generator. In at least one embodiment, the data generator uses the noise vector 205 as an initial condition from which a synthetic data sample (e.g., a synthetic biometric representation) is generated. In at least one embodiment, the template system 100 performs one or more sampling techniques, such as Monte Carlo, to generate the synthetic data sample. In one example of artificial template generation, the template system 100 generates a plurality of noise vectors 205 (e.g., two or more) based on a pseudo-random seed value. In the same example, from each of the plurality of noise vectors 205, the template system 100 generates a synthetic biometric representation, such as a synthetic fingerprint. Continuing the example, the template system 100 processes the plurality of synthetic biometric representations through a capture SDK and generates a plurality of synthetic templates that are stored as a synthetic template population 111. In the same example, to generate a cohort vector from a probe template, the template system performs a one-to-many comparison between the probe template and the synthetic template population 111.

At step 209 the process 200B includes selecting a plurality of templates for inclusion in a set of cohort templates. In various embodiments, the template system 100 selects a plurality of templates by applying one or more cohort selection algorithms or techniques to identify a subset of templates in a template population 111 that demonstrate a desired property, such as a high discrimination ratio (e.g., as defined below), Fisher's ratio, or sensitivity index. In various embodiments, a cohort selection algorithm includes selecting templates for inclusion in a cohort set based on a discrimination metric and/or other metrics (e.g., such as measures related to realistic template degradation and the target representation in a template population 111). In at least one embodiment, the system computes a discrimination ratio for each template of a template population 111 and generates a cohort set (step 212) based on identifying a subset of most-discriminative templates (e.g., a most-discriminative cohort template being the cohort template that is most similar to mated templates and most dissimilar to non-mated templates). According to one embodiment, the template population 111 (e.g., also referred to as a sample population or gallery) excludes a target population comprising the subject. In one example, the template system 100 computes a discrimination ratio for each template of a template population 111 and generates a ranking 115 of the templates based thereon. In the same example, the template system 100 generates a cohort set by selecting a subset of top-ranked templates that demonstrate discrimination ratios meeting a predefined threshold.

Generally a computational power required to perform a one-to-many comparison process (e.g., such as at step 221 of the process 200B) is proportional to a total number of templates in a cohort set (e.g., referred to as a "cohort size"). In at least one embodiment, the present system advantageously reduces required computational power by selecting and including in a cohort set only a subset of templates in a template population 111 that demonstrate the highest level of discrimination (also referred to as a "discrimination ratio"). As used herein "discrimination ratio" generally refers to a ratio of a template's between-class variance to within-class variance. Between-class variance can refer to a level of variance between the template and non-mated templates in the same template population 111 (e.g., templates that are not associated with the same subject). Within-class variance can refer to a level of variance between the template and mated templates in the same template population 111 (e.g., templates that are associated with the same subject). In various embodiments, a discrimination ratio measures the level of similarity between a particular template and one or more mated templates as compared to the level of dissimilarity between the particular template and one or more non-mated templates in the same template population 111.

According to one embodiment, the template system 100 generates a discrimination ratio based on Equation 1 and Equation 2.

$$Y_u^c \equiv \{y_{u,1}^c, y_{u,2}^c, \ldots, y_{u,K}^c\} \quad \text{(Equation 1)}$$

discrimination ratio $(c) =$ $$\frac{\text{between-class variance}}{\text{within-class variance}} = \frac{E_u[(\mu_u^c - \mu^c)^2]}{E_u(E_{y \in Y_u^c}[(y - \mu_u^c)^2])} \quad \text{(Equation 2)}$$

In various embodiments, Y represents a matrix of cohort scores generated as an output of comparing a cohort template c to all samples K of each subject u. In some embodiments, Y is a matrix of N rows by C columns, in which N corresponds to a number of representative target samples and C corresponds to a number of cohort templates. In at least one embodiment, the representative target samples are representative of the biometrics of a target population, but do not include the biometrics of the target population. According to one embodiment, Nis equal to a product of U and K, in which U represents a number of subjects and K represents a number of templates of each subject. In various embodiments, the comparison between each cohort template c to all samples K of each subject u refers to a distance metric, such as a Euclidean distance or $L^2$ norm value.

At step 212 the process 200A includes generating one or more sets of cohort templates based on one or more template populations 111 and/or one or more templates selected therefrom (e.g., at step 209). According to one embodiment, a number of cohort templates included in the set ranges from about 64-8000 templates, about 64 templates, about 128 templates, about 192 templates, about 256 templates, or about 300-8000 templates. In at least one embodiment, from a template population 111, the template system 100 pseudo-randomly generates a set of cohort templates (e.g., based on a seed value). In various embodiments, the set of cohort templates is stored (e.g., at the data store 107) for use in future processes, such as a biometric enrollment process 200B (FIG. 2B).

FIG. 2B shows an exemplary biometric enrollment process 200B, according to one embodiment of the present disclosure. In at least one embodiment, the final output of the process 200B is a TPS template 228 or a normalized FXR cohort vector 225. In one or more embodiments, the template system 100 may generate, store, and process normalized cohort vectors 225 (e.g., without applying irreversible transformations thereto). In various embodiments, the process 200B is performed subsequent to one or more cohort generation processes 200A (FIG. 2A). In one example, to enroll a subject from a particular target population, the template system 100 performs a cohort generation process 200A to generate a set of cohort templates that are representative of the target population. In the same example, the template system 100 performs an enrollment process 200B to enroll the subject based on a one:many comparison between the set of cohort templates and a probe template that represents the subject.

In at least one embodiment, because an original biometric sample is never stored within the system (e.g., apart from temporary storage associated with processing the sample), conversion of the original sample into a cohort vector constitutes erasure of the original sample. The erasure of the original biometric sample may advantageously improve security of PII, because, even if an attacker compromised the system, the attacker would not be able to obtain any personally-identifying biometric information. Furthermore, the implementation of a cohort set-based transformation advantageously allows for cancellation of a subject's template and re-enrollment of the subject into the template system 100 using the same or a new cohort set.

In various embodiments, for a given subject, the system may receive or generate a plurality of target samples and transform each target sample into a TPS template 228 that is stored with TPS templates of other subjects to form a template population 111 of TPS templates for future verification and/or identification processes. In one or more embodiments, as described herein, use of multiple TPS templates for a single subject may improve the accuracy (e.g., reduce the Equal Error Rate (ERR)) of biometric matching processes that utilize the TPS templates during one-to-one and one-to-many comparisons for subject verification and identification, respectively.

At step 215 the process 200B includes receiving input data 216 including, but not limited to, biometric data (e.g., a biometric representation, such as a facial scan) and metadata 113. In one example, an external system 102 receives a facial image of a subject. In another example, the computing environment 101 receives an image of a subject's fingerprints. In some embodiments, the template system 100 receives a subject identifier with which the input data is associated. In one example, a facial image file includes metadata that includes one or more of a subject identifier, a device identifier, capture data (e.g., geolocation, timestamp, capture device, etc.), and demographic information (e.g., age, ethnicity, race, origin, etc.). In at least one embodiment, the template system 200 generates and/or modifies the metadata 113 to include the aforementioned information.

In at least one embodiment, the input data 204 identifies a target population with which a subject is associated, and the template system 100 performs a cohort generation process 200A to generate a set of cohort templates that are representative of the target population (e.g., for use in a one:many comparison, such as at step 221). In some embodiments, before proceeding, the process 200B includes verifying that the received biometric data represents a living subject (e.g., as opposed to being representative of a static image of a living subject). Liveness verification can be performed, for example, to reduce a likelihood of compromising a subject's identity. Exemplary systems and processes for liveness verification are described in U.S. Pat. No. 10,635,894, filed Oct. 13, 2017, entitled "SYSTEMS AND METHODS FOR PASSIVE-SUBJECT LIVENESS VERIFICATION IN DIGITAL MEDIA," which is incorporated herein by reference as if set forth in its entirety.

At step 218 the process 200B includes generating a probe template 219 based on the input data 216. In various embodiments, the probe template 219 is in a proprietary format with which the external system 102 is associated (e.g., a native format of a vendor's capture software development kit (SDK)). In one example, a capture SDK running at the external system 102 generates a probe template 219 based on a facial image. In this example, the external system 102 transmits the probe template 219 and any metadata associated therewith to the computing environment 101.

At step 221, the process 200B includes generating a fixed-size representation (FXR) cohort vector 222 by performing a one-to-many comparison between the probe template 219 and each template of a set of cohort templates that are representative of a target population with which the subject is associated. In one or more embodiments, the template system 100 generates or retrieves a set of cohort templates based on a cohort generation process 200A (FIG. 2A). According to one embodiment, the one-to-many comparison can include a repeated application of n one-to-one comparisons, in which n refers to a number of templates in a set of cohort templates. The comparison can refer to a distance metric, such as a Euclidean distance or an $L^2$ value. According to one embodiment, from the one-to-many comparison process, the template system 100 outputs a resultant cohort vector of n values (e.g., in a format that corresponds to the SDK of the external system 102). For example, a one-to-many comparison process performed using a set with 500 cohort templates generates an FXR cohort vector 222 of 500 positive integer values, each value thereof being a calculated comparison metric, such as a similarity or distance metric (e.g., Euclidean distance and $L^2$ norm), between the target sample and a cohort template from the set. In at least one embodiment, the output cohort vector is referred to as a fixed-size representation (FXR) cohort vector 222 (e.g., as the size of the biometric representation has been fixed to a number of dimensions equal to a number of templates in the cohort set).

At step 224, the process 200B includes normalizing the FXR cohort vector 222 to generate a normalized FXR cohort vector 225 (e.g., a unit vector). Vector normalization can be performed according to techniques understood by one of ordinary skill in the art.

At step 227, the process 200B includes applying one or more lossy, irreversible transformations to the normalized FXR cohort vector 225 to generate a TPS template 228. In one example, the template system 100 applies an Evergreen hash transformation, also known as $(IT)^2$ forward transform, to the normalized FXR cohort vector 225 and outputs a TPS template 228 (e.g., or $(IT)^2$ token). In various embodiments, the template system 100 generates a TPS template 228 that is uniquely representative of the subject but cannot be reverted into the normalized cohort vector 225 (e.g., for purposes of reconstructing the original biometric image or template). In various embodiments, the TPS template 228 is an irreversible, privacy-secured representation of the target sample because the irreversible transform is "lossy," meaning that information required to reconstruct the target sample is irreversibly lost, thereby eliminating the possibility of reconstructing the target sample with 100% fidelity. In some embodiments, to increase template security and further prevent reversibility the template system 100 uses auxiliary data as an additional input to irreversible transformations, thereby "salting" the process and resultant TPS template 228 with random data that is not associated with the subject.

In at least one embodiment, the TPS template 228 is a vector whose elements contain values between −127 and 128 (e.g., an 8 byte integer). In some embodiments, a size of the TPS template 228 is 32 or 64 bytes (but is not limited to these specific value or size metrics). For the purposes of illustration, Table 1 provides an exemplary visualization of cohort template vector values, normalized cohort template vector values, and TPS template values from 1 to n number of samples (e.g., cohort templates). In various embodiments, an FXR cohort vector 222, a normalized FXR cohort vector 225, and a TPS template 228 each include at least about 100 elements (e.g., each element corresponding to a cohort template comparison).

TABLE 1

Vector values of an exemplary enrollment process.

| Cohort Vector | | | | | | | | | |
|---|---|---|---|---|---|---|---|---|---|
| Dimension | 0 | 1 | 2 | 3 | 4 | 5 | 6 | 7 | n |
| | 20 | 16 | 14 | 8 | 1 | 28 | 27 | 33 | 19 |
| | 32 | 30 | 25 | 34 | 10 | 30 | 18 | 19 | 14 |
| | 31 | 2 | 3 | 14 | 4 | 13 | 16 | 32 | 4 |
| | 14 | 3 | 17 | 35 | 25 | 6 | 20 | 13 | 25 |
| | 2 | 28 | 7 | 16 | 11 | 13 | 13 | 16 | 17 |
| | 34 | 18 | 18 | 19 | 8 | 18 | 12 | 12 | 20 |
| | 32 | 10 | 27 | 25 | 7 | 34 | 11 | 1 | 21 |
| | 32 | 18 | 25 | 23 | 6 | 35 | 17 | 20 | 34 |

| Normalized Cohort Vector | | | | | | | | | |
|---|---|---|---|---|---|---|---|---|---|
| Dimension | 0 | 1 | 2 | 3 | 4 | 5 | 6 | 7 | n |
| | 0.0167 | 0.00145 | 0.01263 | 0.01102 | 0.00963 | 0.00843 | 0.00741 | 0.00655 | 0.00584 |
| | 0.00874 | 0.00776 | 0.00688 | 0.0061 | 0.00543 | 0.00485 | 0.00436 | 0.00396 | 0.00366 |
| | 0.02724 | 0.02289 | 0.00194 | 0.01642 | 0.01394 | 0.0119 | 0.01025 | 0.0089 | 0.0078 |
| | 0.01926 | 0.01656 | 0.01428 | 0.01235 | 0.01071 | 0.00932 | 0.00815 | 0.00716 | 0.00634 |
| | 0.0394 | 0.03217 | 0.02676 | 0.02215 | 0.01834 | 0.0153 | 0.0129 | 0.01097 | 0.00942 |
| | 0.02451 | 0.02156 | 0.01883 | 0.0164 | 0.01431 | 0.01255 | 0.01109 | 0.00989 | 0.00891 |
| | 0.02229 | 0.01944 | 0.01686 | 0.01461 | 0.01271 | 0.01112 | 0.00979 | 0.00867 | 0.00774 |
| | 0.02411 | 0.02033 | 0.01742 | 0.01492 | 0.01281 | 0.01106 | 0.00963 | 0.00846 | 0.0075 |

| TPS Template | | | | | | | | | |
|---|---|---|---|---|---|---|---|---|---|
| Dimension | 0 | 1 | 2 | 3 | 4 | 5 | 6 | 7 | n |
| | −39 | −28 | −6 | −37 | −18 | −63 | 8 | 20 | 4 |
| | −53 | −28 | −6 | −29 | −27 | −42 | 22 | 22 | 10 |
| | −55 | −51 | −3 | −12 | −31 | −76 | 32 | −7 | −10 |
| | −52 | −44 | −19 | −21 | −17 | −54 | 14 | −3 | −3 |
| | −44 | −40 | −15 | −11 | −16 | −64 | 22 | −23 | −14 |

TABLE 1-continued

Vector values of an exemplary enrollment process.

| | | | | | | | | |
|---|---|---|---|---|---|---|---|---|
| −43 | −46 | 6 | −17 | 4 | −70 | 4 | −5 | 16 |
| −45 | −31 | −12 | −38 | −21 | −52 | 16 | 34 | 2 |
| −48 | −40 | −16 | −16 | −30 | −45 | 33 | 1 | 7 |
| −48 | −19 | 34 | −15 | −21 | −71 | 9 | 14 | 20 |

At step 230, the process 200B includes storing the TPS template 228 and/or normalized FXR cohort vector 225. In some embodiments, the computing environment 101 transmits the TPS template 228 or normalized FXR cohort vector 225 to one or more external systems 102 (e.g., the external system 202 from which input data was received or a separate external system 202). In at least one embodiment, the template system 100 stores the TPS template 228 to "enroll" the associated subject for the purposes of future identification and verification processes (e.g., as performed by a biometric matcher SDK). In some embodiments, with the TPS template 228 stored, a biometric matcher (e.g., of the computing environment 101 or an external system 102) executes a deduplication process to eliminate redundant data objects in one or more data stores, such as the data store 107. In some embodiments, the template system 100 transmits an identifier with which the subject and TPS template 228 are associated, thereby providing a key by which subsequent verification processes may be performed.

FIG. 3 shows an exemplary biometric verification process 300. In various embodiments, the process 300 is performed to verify a subject's identity before providing the subject access to a physical or digital environment. In one example, a subject attempts to unlock a smartphone for which biometric security features have been enabled. In this example, a biometric capture SDK on the smartphone captures a facial image of the subject and transmits the facial image and an identifier to the computing environment 101 for verification. In the same example, in response to the computing environment 101 positively verifying the subject, a security program unlocks the smartphone to provide access to the subject. As will be understood and appreciated, aspects of the present systems and methods can be used in any situation or environment in which biometric verification is utilized to grant access or permissions to a subject to access a physical or digital environment.

At step 303, the process 300 includes receiving input including, but not limited to one or more biometric representations (e.g., facial scans, fingerprint images, etc.) of a subject and, in some embodiments, an identifier with which the subject is associated. In one example, the input includes a plurality of facial scans (e.g., 3-4 scans, 5-6 scans, etc.) and a subject identifier (also referred to as a key). In at least one embodiment, the input includes an identifier (e.g., a device or system identifier) that indicates a particular external system 102 with which the input is associated. In one or more embodiments, the template system 100 retrieves one or more TPS templates based on the identifier. In some embodiments, the input includes matching criteria, such as a minimum similarity or distance threshold (e.g., 85% matching confidence, 90% matching confidence, etc.), that the template system 100 leverages to control positive verification. In one example, the template system 100 receives an identifier and a probe facial scan, processes the identifier, and retrieves one or more TPS templates (e.g., from a hash registry 109) that are associated with the identifier.

At step 306, the process 300 includes determining that a subject is enrolled in the template system 100 (e.g., based on the identifier). In various embodiments, determining that the subject is enrolled includes successfully retrieving at least one TPS template or normalized cohort vector that is associated with the identifier (e.g., successful retrieval indicating enrollment). In at least one embodiment, in response to a failure to retrieve at least one TPS template associated with the identifier, the template system 100 determines that the subject is not enrolled. In at least one embodiment, in response to determining that the subject is enrolled, the process 300 proceeds to step 309. In one or more embodiments, in response to determining that the subject is not enrolled, the template system 100 performs an enrollment process, such as the enrollment process 200B (FIG. 2B), and proceeds to step 318. In some embodiments, in response to determining that the subject is not enrolled, the template system 100 performs an enrollment process and proceeds to step 303 at which point the template system 100 may receive additional input data (e.g., additional biometric data, such as a second facial scan) that is used, along with the resultant TPS template(s) from the enrollment process, to verify an identity of the associated subject.

At step 309, the process 300 includes generating a probe TPS template based on the input. In some embodiments, a probe TPS template is not generated and, instead, the template system 100 generates a normalized cohort vector as the final representation of the subject. In various embodiments, the template system 100 generates a TPS template for each scan or other representation received at step 303 (e.g., in response to receiving four scans, four probe TPS templates are generated). Generally, the process for generating the probe TPS template or normalized cohort vector is substantially similar to the enrollment process 200B (FIG. 2B).

At step 312, the process 300 includes performing one or more one-to-one comparisons between the probe TPS template generated from the input and one or more stored TPS templates (e.g., referred to as "reference templates") that were retrieved based on the identifier. In various embodiments, the template system 100 calculates a similarity score, such as a distance score, between each of the retrieved TPS templates and the probe TPS template. In one example, the template system 100 retrieves four reference templates (e.g., though the use of any number of reference templates is contemplated) and performs a one-to-one comparison between each reference template and a probe TPS template. In this example, for each comparison, the template system computes an $L^2$ norm value or Euclidean distance between the probe TPS template and the reference templates. In at least one embodiment, when multiple reference templates are used, the template system 100 computes a mean similarity metric by averaging the similarity metrics generated from each one-to-one comparison. In alternate embodiments, the template system 100 defines an overall similarity metric for the probe TPS template by selecting a minimum similarity metric (e.g., such as a distance score that is lower compared to all other distance scores for the same probe TPS template).

At step 315, the process 300 includes determining that a predefined similarity threshold is satisfied. According to one embodiment, the implementation of a predefined similarity threshold advantageously reduces a likelihood of false positive verification. In various embodiments, the predefined similarity threshold refers to a minimum magnitude of a similarity metric that is deemed sufficient for positively verifying an identity of a subject. In one or more embodiments, the predefined similarity threshold is defined based on input from an external system 102. For example, a first external system 102 may require an 80% or greater match to positively verify identity and a second external system 102 may require at least a 95% match to positively verify identity. In at least one embodiment, a magnitude of the predefined similarity threshold is optimized based on one or more optimization techniques, such as K-folds cross validation, that the template system 100 performs on a predictive biometric matching model (e.g., that is trained to verify subject identity using sets of subject-labeled and unlabeled biometric data).

In at least one embodiment, in response to determining that the predefined threshold is satisfied, the template system 100 positively verifies the identity of the subject and the process 300 proceeds to step 321. In some embodiments, in response to determining that the predefined threshold is not satisfied, the process 300 proceeds to step 318. In various embodiments, when multiple, mated reference templates are used, the template system 100 determines threshold satisfaction for each corresponding distance metric on an individual basis. In one example, to be satisfied, a predefined threshold requires a minimum number or percentage of threshold-satisfying similarity metrics (e.g., at least 50%, 75%, 85%, etc., of the similarity metrics must satisfy the predetermined threshold to positively verify the subject). In some embodiments, the template system 100 determines threshold satisfaction based on comparing an overall average similarity metric or a minimum value similarity metric to the predetermined threshold. In one example, upon satisfaction of the verification threshold, the system automatically transmits a verification signal to one or more computing environments. The verification signal can cause the one or more computing environments to grant access to the subject. In another example, the system automatically transmits a verification signal to a lock system, or the like, that disengages a locking mechanism in response to receiving the signal.

At step 318, the process 300 includes transmitting an alert (e.g., an electronic communication, such as an email, text, online message, push notification, etc.). In one example, the template system 100 transmits an alert to an external system 100 from which input was received at step 303. In this example, the alert includes an electronic notification indicating that the subject's identity could not be verified. In a similar example, the template system 100 transmits an alert indicating that the subject was not enrolled in the template system 100 and has since been successfully enrolled. In this example, the alert includes at least one TPS template and/or a corresponding identifier generated during enrollment of the subject. As will be understood and appreciated, in some embodiments of the system, no alert is transmitted (e.g., for security or other purposes).

At step 321, the process 300 includes performing one or more actions. In various embodiments, the actions include, but are not limited to, causing a locking mechanism to unlock or lock, causing a gateway to be opened or closed (e.g., a physical gateway, such as a door, or a digital gateway, such as access to a particular set of computing resources), providing a subject access to a particular computing environment or networking address, initiating financial transactions, providing digital signatures, or any other action as will occur to one of ordinary skill in the art. In one example, in response to positively verifying the subject, the template system 100 causes a physical door to unlock, thereby permitting the subject's entry into a particular location. In another example, the template system 100 causes a smartphone to unlock. In another example, the template system 100 transmits a notification to the external system 102 indicating the positive verification of the subject's identity. In the same example, the notification can include a similarity metric and/or a predefined similarity threshold (e.g., used to positively verify the subject's identity). In another example, the template system 100 automatically re-enrolls the subject using the probe TPS template (e.g., in replacement of or addition to the reference templates).

FIG. 4 shows an exemplary identification process 400 according to one embodiment of the present system. In one example, a forensic system receives a fingerprint scan from law enforcement and transmits the fingerprint scan to the computing environment 101 for identification. In this example, in response to the computing environment 101 positively identifying at least one stored fingerprint template (e.g., a TPS template) that matches a fingerprint template generated from the fingerprint scan, the forensic system determines that a subject associated with the stored fingerprint template was at a location where the fingerprint scan was originally obtained.

At step 403, the process 400 includes receiving input including, but not limited to, one or more biometric representations (e.g., facial scans, fingerprint images, etc.). In at least one embodiment, the input includes an identifier for a particular template population 111 from which the template system 100 retrieves or generates TPS templates for the purposes of performing one-to-many comparisons to positively identify the subject. In some embodiments, the input includes matching criteria, such as a predefined similarity threshold.

At step 406, the process 400 includes generating a normalized cohort vector and/or a probe TPS template based on the input. In various embodiments, the template system 100 generates a probe TPS template for each scan or other representation received at step 403 (e.g., in response to receiving three scans, three probe TPS templates are generated). Generally, the process for generating the probe TPS template or normalized cohort vector is substantially similar to the enrollment process 200B (FIG. 2B).

At step 409 the process 400 includes performing a one-to-many comparison (e.g., which may be a sequence of many one-to-one comparisons) between one or more probe TPS templates and a template population 111 (also referred to as a "sample population"). In some embodiments, the one-to-many comparison is a nearest neighbor retrieval technique that seeks to find a reference template that is most similar (or least dissimilar) to one or more probe templates. For example, the template system 100 generates an index tree of reference templates and performs a nearest neighbor retrieval operation between each probe TPS template and each reference template. According to one embodiment, the template system 100 utilizes one or more indexing algorithms to generate an indexing search tree. In at least one embodiment, the indexing algorithm allows the one-to-many comparison operation to be performed in logarithmic time with respect to the number of reference templates in the template population 111.

In one example, based on an identifier, the template system 100 retrieves a particular template population 111 (e.g., a template population 111 that is representative of the subject and/or an external system 102) and computes a similarity metric between each probe TPS template and each TPS template in the template population 111. In various embodiments, the template system 100 computes a mean similarity metric for each set of mated reference templates based on the individual similarity metric of each one-to-many comparison. In one or more embodiments, the similarity metric includes, but is not limited to, Euclidean distance, $L^2$ norm value, and other suitable measures of (dis)similarity. In one or more embodiments, the template system 100 computes a secondary mean similarity metric based on averaging the mean similarity metric of each probe TPS template and set of mated reference samples. In an alternate embodiment, for each set of mated reference templates, the template system 100 defines an overall similarity metric based on identifying a minimum similarity metric out of all similarity metrics computed for all probe TPS templates.

At step 412, the process 400 includes generating one or more rankings 115 based on the results of the one-to-many comparison. In one example, the template system 100 ranks sets of mated reference templates based on mean similarity metric. In another example, the template system 100 ranks sets of mated reference templates based on minimum similarity metric. In various embodiments, the template system 100 stores the rankings 115.

At step 415, the process 400 includes determining that a predefined similarity threshold is satisfied by identifying, from the ranking 111, at least one top-ranked reference template, or mated reference template set, and comparing the corresponding similarity metric to the predefined similarity threshold. In at least one embodiment, in response to determining that at least one top-ranked reference template demonstrates a threshold-satisfying similarity metric, the process 400 proceeds to step 421 and, in some embodiments, performs an enrollment process 200B (FIG. 2B) to re-enroll the subject (e.g., using the TPS template generated at step 406). In various embodiments, re-enrolling a subject after each positive identification may provide a more diverse and up-to-date set of reference templates for future identification and verification of the subject (e.g., potentially improving matching accuracy). In one or more embodiments, in response to determining that at least one top-ranked reference templates does not demonstrate a threshold-satisfying similarity metric, the process 400 proceeds to step 418. According to one embodiment, the implementation of a predefined similarity threshold advantageously reduces a likelihood of false positive identification.

At step 418 the process 400 includes transmitting an alert (e.g., an electronic communication, such as an email, text, online message, push notification, etc.). In one example, the template system 100 transmits an alert to an external system 100 from which input was received at step 403. In this example, the alert includes an electronic notification indicating that the subject could not be identified. In a similar example, the template system 100 transmits an alert indicating that the subject has been enrolled in the biometric template system 100. In this example, the alert includes at least one TPS template and/or a corresponding identifier generated during enrollment of the subject. In some embodiments, the template system 100 transmits a query that allows an external system 102 to choose between enrolling and not enrolling the unidentified subject. In at least one embodiment, the subject is enrolled and the TPS template generated therefrom is stored separately from the template population 111 specified in the input from step 403. In one or more embodiments, the template system 100 receives additional input that specifies one or more additional template populations 111 for which the process 400 will be repeated (e.g., thereby diversifying and/or broadening the scope of the identification attempt).

At step 421, the process 400 includes performing one or more actions. In various embodiments, the actions include, but are not limited to, causing a locking mechanism to unlock or lock, causing a gateway to be opened or closed (e.g., a physical gateway, such as a door, or a digital gateway, such as access to a particular set of computing resources), providing a subject access to a particular computing environment or networking address, initiating financial transactions, providing digital signatures, or performing any other action as will occur to one of ordinary skill in the art. In one example, in response to positively identifying the subject, the template system 100 transmits a notification to the external system 102 indicating the positive identification of the subject. In the same example, the notification includes metadata 113 with which the top-ranked reference template is associated, the metadata 113 including, but not limited to, a subject identifier, subject name, demographic information, etc. In another example, the template system 100 automatically re-enrolls the subject using the probe TPS template (e.g., in replacement of or addition to the top-ranked reference template).

Figure 5:
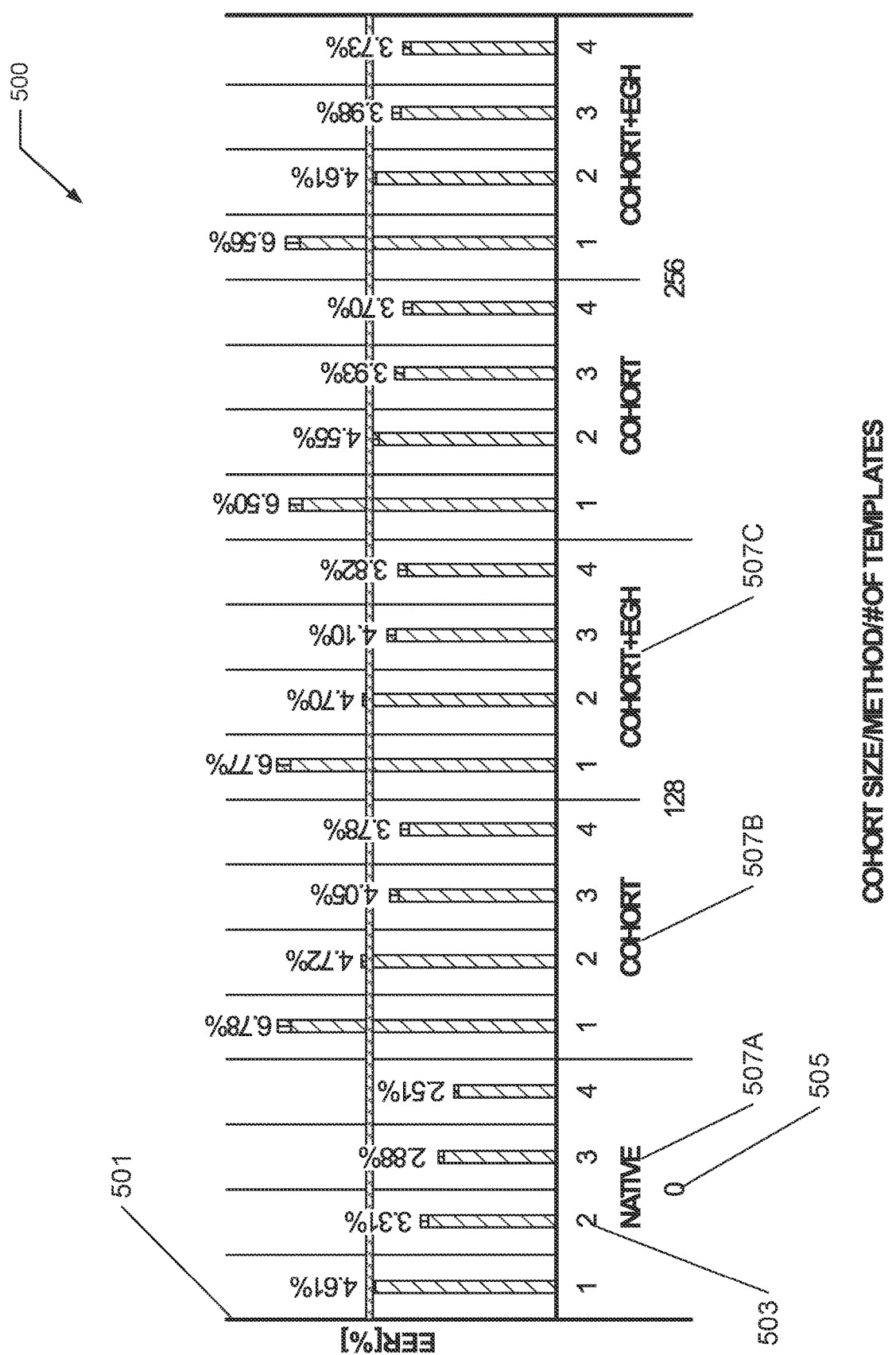
FIGS. 5-9 are charts showing exemplary biometric matching performance, according to one embodiment of the present disclosure.

FIG. 5 shows a chart 500 illustrating exemplary biometric matching performance.

Figure 6:
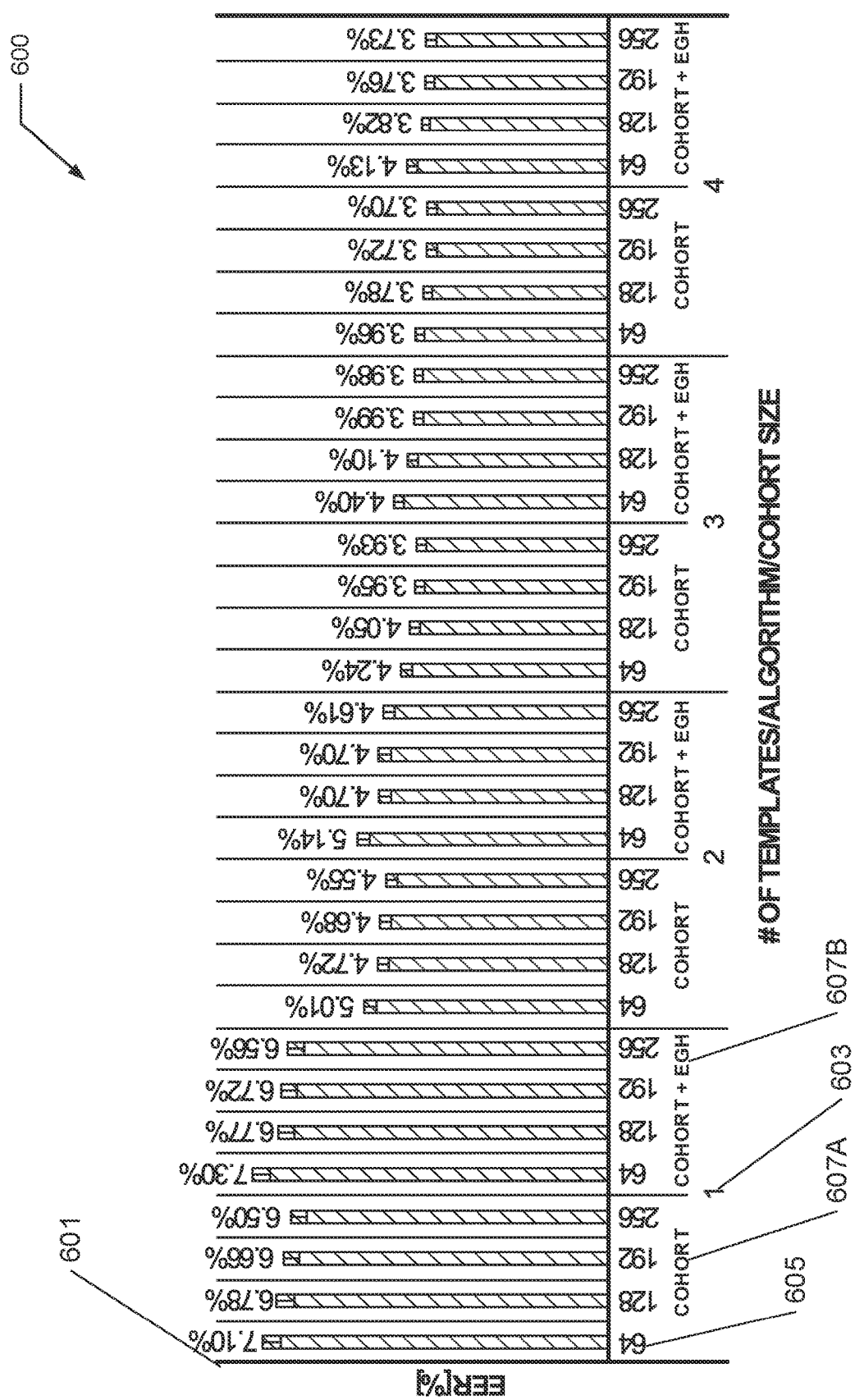

FIG. 6 shows a chart 600 illustrating exemplary biometric matching performance.

Figure 7:
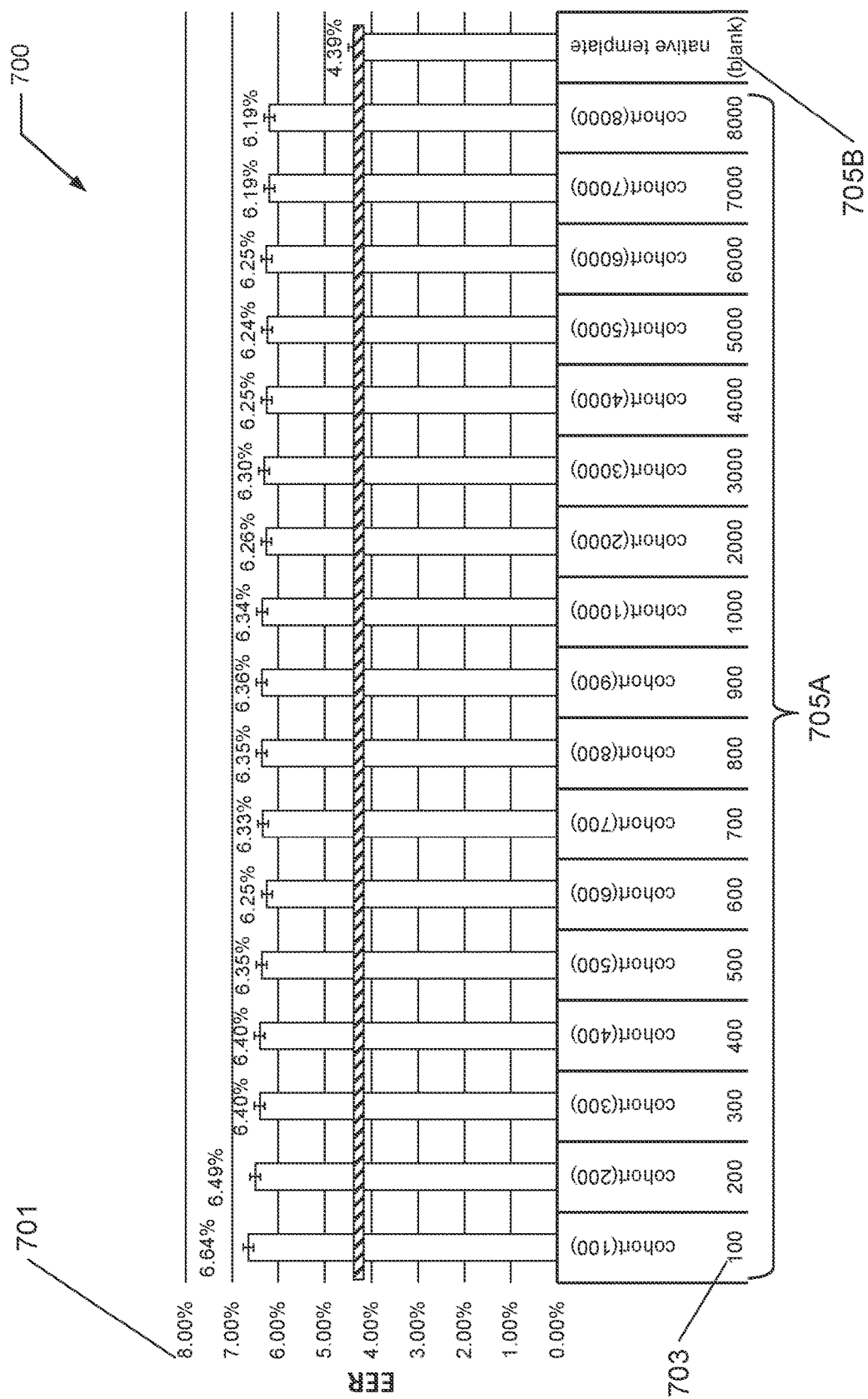

FIG. 7 shows a chart 700 illustrating exemplary biometric matching performance.

FIGS. 5-9 are described in greater detail in the below section, which relates to experimental results obtained from the exemplary biometric matching processes of the present technology.

Exemplary Experimental Results

The following section describes one or more experimental tests, and results thereof, performed on one or more embodiments of systems and methods described herein. The descriptions therein are provided for the purposes of illustrating various elements of the systems and methods (e.g., as observed in the one or more embodiments).

All descriptions, embodiments, and the like are exemplary in nature and place no limitations on any embodiment described or anticipated herein.

Experimental Protocol 1

A series of experiments were conducted utilizing a publicly accessible face database containing realistic and challenging facial samples, such as, for example, images of blurry faces and off-frontal faces. To perform the experiment, a subset of 100,000 samples were utilized and organized as shown in Table 2. The experiment included performing biometric matching accuracies achieved under three different feature representation schemas, including: 1) a native schema, where native feature vectors derived from a dlib open-source face recognition library were used; 2) a cohort schema, where cohort representation with normalized cohort vectors were used, the normalized cohort vectors having lengths of 64, 128, 192, and 256 floating point numbers; and 3) a cohort+EGH schema, where the cohort schema was used but the normalized vectors were further privacy-secured by irreversible transformation (e.g., to generate TPS templates).

A rationale in utilizing the cohort+EGH schema is that the EGH transform provides additional security to the normalized cohort vectors due to its anonymization operations that include, but are not limited to, noise addition, obfuscation, and/or feature discretization. Length of the output vector of the EGH transform is the same as the corresponding normalized cohort vector input. For example, if a normalized cohort vector of length 64 is used (e.g., the vector has 64 floating point numbers), the EGH transform produces an output vector (e.g., TPS template, such as a biohash or $(IT)^2$ token) with length 64 (signed 8-bit integer) elements. In at least one embodiment, EGH can further reduce the dimension to achieve a more compact representation.

TABLE 2

Experiment protocol used in accuracy investigation

| User type | Is enrolled user? | Number of samples |
|---|---|---|
| Gallery | Yes | 5656 |
| Probe | Yes | 5656 |
| Probe | No | 41643 |
| Cohort | No | 8949 |

The experiment included 23,423 unique subjects. From the 23,243 subjects, 1,414 subjects were included in a gallery set. Each subject in the gallery set included 8 facial samples of which 4 were included in the gallery set (for a total of 5,656 samples) and the remaining 4 were included in an enrolled probe set (for a total of 5,656 samples). Samples of subjects not included in the gallery were organized into a non-enrolled probe set and a cohort set. The gallery set refers to facial samples that served as, depending on the schema tested, biometric templates, or TPS templates (biohashes or $(IT)^2$ tokens). The enrolled and non-enrolled probe sets refer to facial samples that were subject to feature extraction (resulting in normalized cohort vectors as well as those of cohort+EGH schema) and subsequent biometric matching processes. The cohort set refers to facial samples that were used as basis for enabling one-to-many comparison processes required to derive the cohort representation.

To execute the experiment, a biometric matcher performed recognition processes on the non-enrolled and enrolled probe sets under each of the three feature representation schemas; therefore, accuracy of each schema was dependent upon affirmative recognition of the enrolled samples and negative recognition of the non-enrolled samples. Due to randomization processes, the cohort and cohort+EGH schemas were run five times, and Equal Error Rate (EER) for each schema was computed by averaging the EER across the five runs. As described herein, the lower the EER, the more accurate the system. For example, a 0% EER indicates a perfect recognition accuracy, whereas a 50% EER suggests that demonstrated accuracy is no better than a random guess.

Execution of the experiment generated 7,991,928 non-mated (e.g., impostor) scores and 5,656 mated (e.g., genuine) scores that serve as unbiased data for measuring EER of each schema. Results were analyzed with respect to factors including, but not limited to, schema type, number of biometric templates used in matching, and cohort size. Exemplary results of the above described experiments are illustrated in FIGS. 5-7.

FIG. 5 shows a chart 500 illustrating exemplary biometric matching performance, expressed as EER 501. In at least one embodiment, the chart 500 relates EER 501 to template quantity 503 (e.g., a number of subject samples evaluated during one-to-many comparison), cohort size 505 (e.g., a number of TPS templates used to generate the one or more probe TPS templates), and schemas 507A-C. In various embodiments, the schemas 507A-E include a native schema 507A, a cohort schema 507B, and a cohort+EGH schema 507C. According to one embodiment, the chart 500 demonstrates that, compared to the native schema 507A, the cohort schema 507B and cohort+EGH schema 507C demonstrated inferior EER 501 given the same template quantity 503 and cohort size 505. However, for reasons described herein, the cohort schema 507B and cohort+EGH schema 507C provide superior template security and privacy as compared to the native schema 507A. In at least one embodiment, the chart 500 demonstrates that, compared to the cohort schema 507B, the cohort+EGH schema 507C demonstrates superior EER 501. In one or more embodiments, the chart 500 shows that EER 501 of all schemas 507A-C is reduced as the template quantity 503 is increased. In one or more embodiments, the chart 500 demonstrates that EER 501 of the cohort schema 507B and cohort+EGH schema 507C is reduced as cohort size 505 is increased. According to one embodiment, if we consider the native schema 507A with a template quantity 503 of one to be a baseline of accuracy, the accuracy of cohort schema 507B and cohort+EGH schema 507C becomes competitive when using a template quantity 503 of two or more templates. In various embodiments, cohort schemas 507B and cohort+EGH schemas 507C that use two or more templates may allow biometric matching systems to retain sufficient accuracy metrics while advantageously improving security and maintaining privacy.

FIG. 6 shows a chart 600 illustrating exemplary biometric matching performance, expressed as EER 601. In at least one embodiment, the chart 600 relates EER 601 to template quantity 603, cohort size 605, and schemas 607A-B. In various embodiments, the schemas 607A-B include a cohort schema 607A and a cohort+EGH schema 607B. In at least one embodiment, the chart 600 shows that the cohort schema 607A and cohort+EGH schema 507B display similar EER 601 given the same template quantity 603 and cohort size 605. According to one embodiment, the chart 600 indicates that EER 601 is reduced with increasing template quantity 603 and cohort size 605 (e.g., potentially at a cost of greater computing power requirements or processing time). In one or more embodiments, the cohort+EGH schema 607B is superior to the cohort schema 607A, at least because the cohort+EGH schema 607B provides greater security and privacy.

FIG. 7 shows a chart 700 illustrating exemplary biometric matching performance, expressed as EER 701. In at least one embodiment, the chart 700 relates EER 701 to cohort size 703 of a cohort schema 705A and a native schema 705B. According to one embodiment, the chart 700 shows that, for the cohort schema 705A, increasing cohort size 703 does not significantly improve EER 701 (e.g., as compared to a quantity of templates used, as shown in FIGS. 5 and 6). In one example, for the cohort schema 705A, increasing the cohort size 703 by two order of magnitudes is insufficient for achieving an EER 701 that is competitive or at least equal to the EER 701 of the native schema 705. According to one embodiment, the chart 700 demonstrates that smaller cohort sizes 703 can be implemented without significantly increasing EER 701, thereby indicating that smaller, more computationally efficient cohort sizes 703 may be used (e.g., with an expectation of comparable performance when greater cohort sizes 703 are used).

Experimental Protocol 2

To demonstrate the effectiveness of the cohort selection strategy, a second experimental protocol is performed. According to one embodiment, the experiment includes, but is not limited to, extracting fingerprint minutiae to produce an xyt file (e.g., a minutiae file) for each fingerprint impression and comparing pairs of xyt files using a matcher function.

In an exemplary scenario, 4400 xyt files are prepared as cohort samples and a second set of 1204 xyt files are prepared to simulate the target population. This is the test set on which accuracy will be measured in terms of Equal Error Rate (EER). An EER is an operating point where false acceptance rate is equal to false rejection rate (FRR). A lower EER value indicates better performance. EER may be desirable to use for at least two reasons. First, EER is unique for a given ROC curve. Second, it is not influenced by highly imbalanced data. For example, with 1204 samples, 660 mated comparisons will be generated compared to 116,940 non-mated comparisons. A mated comparison can refer to a comparison operation involving two fingerprint impressions belonging to the same finger whereas a non-mated comparison may refer to a comparison operation involving impressions from two different fingers.

A plurality of EER scores are determined by generating a set of cohort templates (e.g., based on the 4400 xyt files), generating a plurality of FXR cohort vectors (e.g., based on the 1204 xyt files and the set of cohort templates), sorting and selecting cohort samples based on discrimination ratio, comparing mated and non-mated FXR cohort vectors to generate a plurality of similarity scores (e.g., such as a L2 norm value), and computing an EER value for each xyt file in the second set based on the plurality of similarity scores. The process produces an EER data matrix X including 1204×4400 dimensions. The columns of the data matrix X are sorted based on corresponding discrimination ratio and grouped into batches of 100 columns (e.g., 100 cohort templates), thus the first column may represent a subset of cohort templates that demonstrate a highest level of discriminatory power. Following sorting and grouping, the data matrix X includes batches 0-19, in which batch 0 contains columns 0 to 99, batch 1 contains columns 100 to 199, until batch 19, which contains columns 1900 to 1999. An average EER can be computed for each batch by average the EER values of the columns that formed the batch. According to one embodiment, charts 800 and 900 (e.g., as shown in FIGS. 8 and 9, respectively) are generated based on the sorted, grouped data matrix X.

Figure 8:
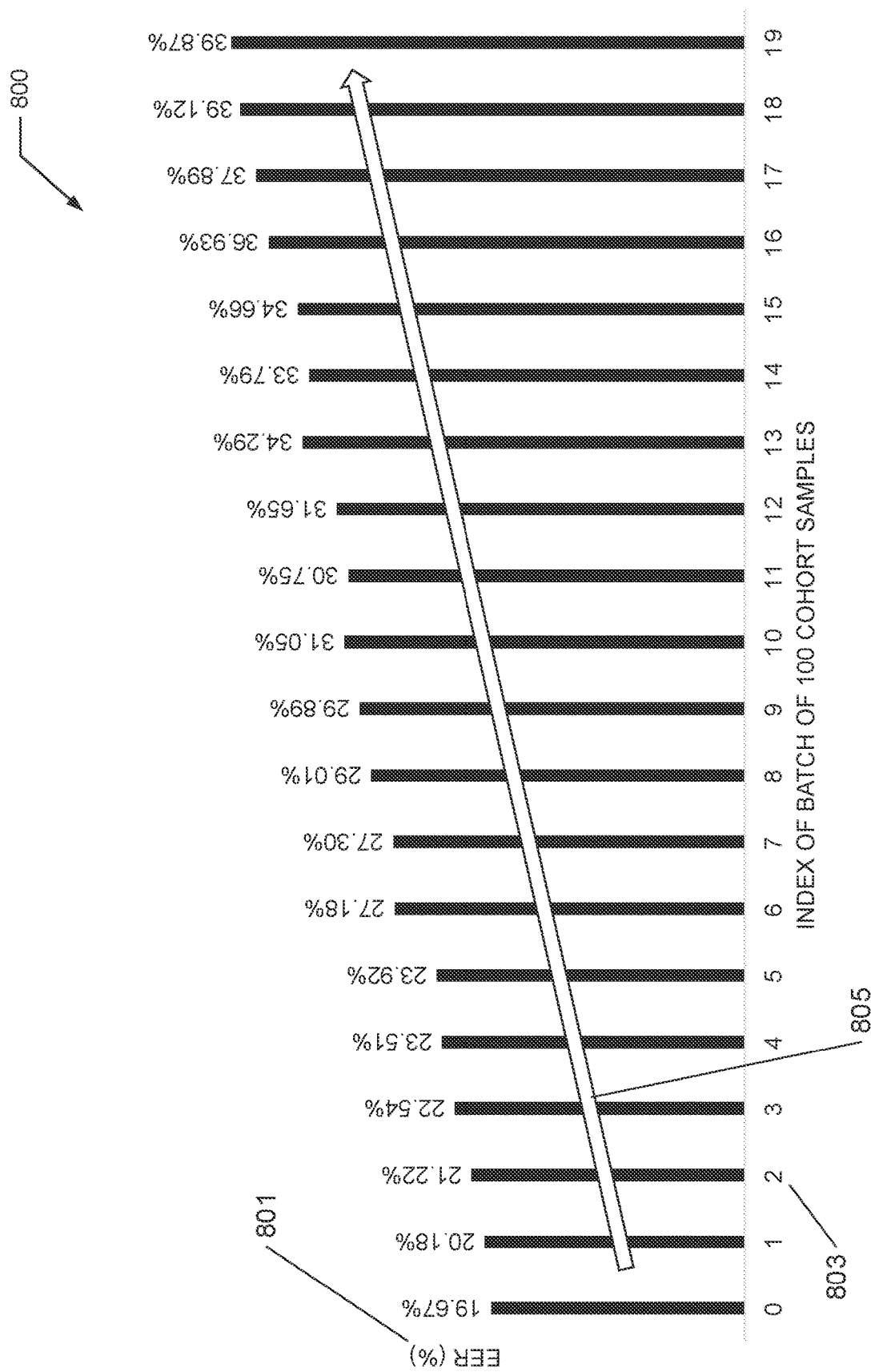

FIG. 8 shows a chart 800 illustrating exemplary biometric matching performance, expressed as average EER 801. In at least one embodiment, the chart 800 relates average EER 801 to cohort batches 803 (e.g., each batch 0-19 including 100 cohort templates, the templates being first ranked by discrimination ratio and grouped into the cohort batches 803). According to one embodiment, a trend 805 demonstrates an inverse relationship between EER 801 and discrimination ratio. Thus, in at least one embodiment, the chart 800 shows that EER 801 increases as discrimination ratio (e.g., represented by cohort batches 803) decreases. In at least one embodiment, batches 20+ are not shown (e.g., as the EER-discrimination relationship may be sufficiently demonstrated by batches 0-19). In various embodiments, the chart 800 demonstrates that discrimination ratio is an effective metric for selecting templates to include a set of cohort templates.

Figure 9:
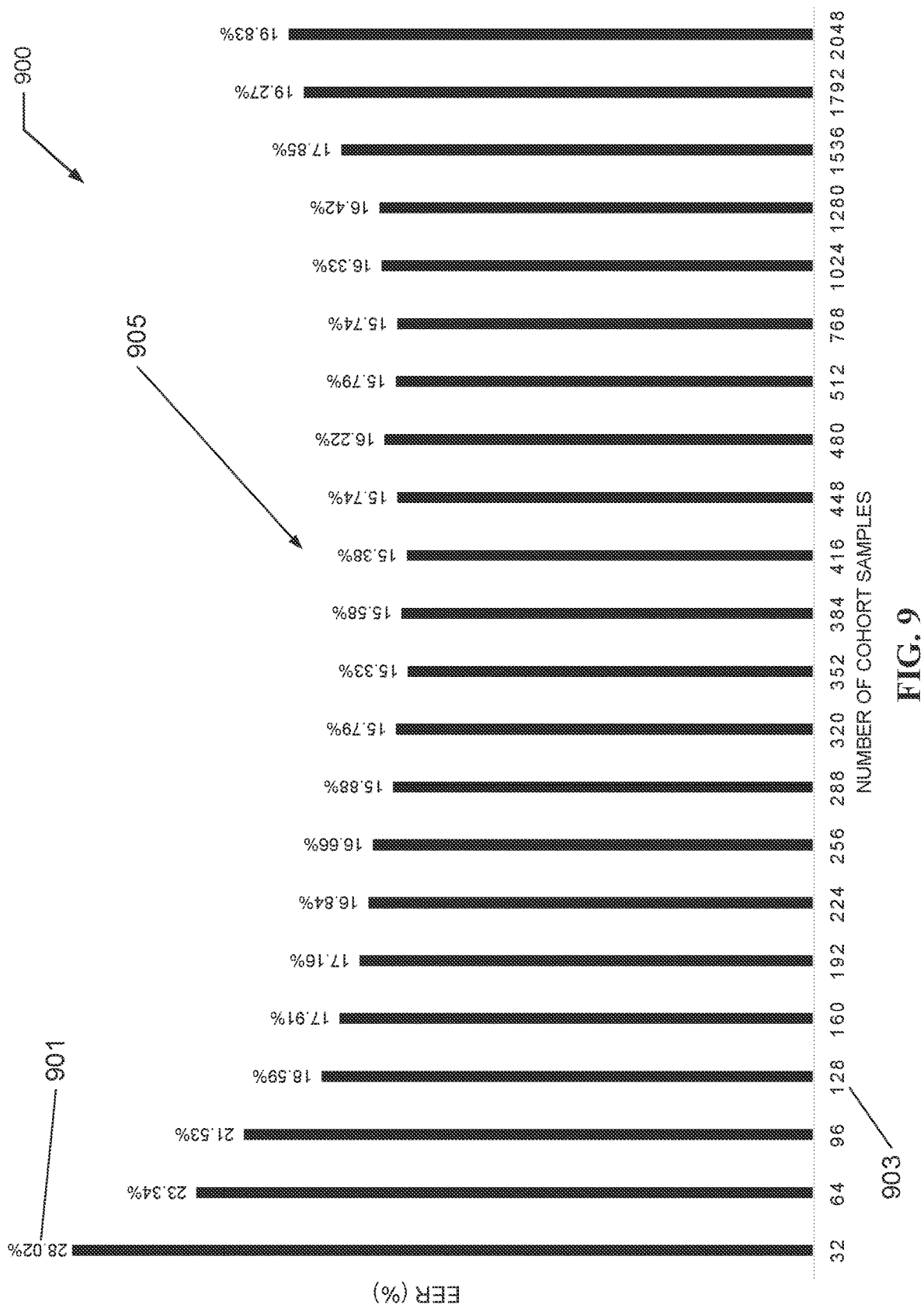

FIG. 9 shows a chart 900 illustrating exemplary biometric matching performance, expressed as average EER 901. In at least one embodiment, the chart 900 relates average EER 901 to a cohort sample size 903. According to one embodiment, the cohort sample size 903 refers to a number of top-ranked templates (e.g., based on discrimination ratio) that are included in a set of cohort templates. In one example, columns of the data matrix X are sorted by discrimination ratio but are not grouped into batches. In this example, EER 901 is computed from comparison processes performed using cohort template sets of increasing size (e.g., incrementing cohort sample size 903 by 32 templates for each comparison). In one or more embodiments, the chart 900 demonstrates that, until reaching an inflection region 905, EER 901 decreases as cohort sample size 903 increases, and, after reaching the inflection region 905, EER 901 increases as cohort sample size 903 increases. In at least one embodiment, the chart 900 shows that an optimal cohort sample size 903 may be about 352-416 templates (e.g., selected from a ranking of a plurality of templates based on discrimination ratio).

Aspects, features, and benefits of the systems, methods, processes, formulations, apparatuses, and products discussed herein will become apparent from the information disclosed in the exhibits and the other applications as incorporated by reference. Variations and modifications to the disclosed systems and methods may be effected without departing from the spirit and scope of the novel concepts of the disclosure.

It will, nevertheless, be understood that no limitation of the scope of the disclosure is intended by the information disclosed in the exhibits or the applications incorporated by reference; any alterations and further modifications of the described or illustrated embodiments, and any further applications of the principles of the disclosure as illustrated therein are contemplated as would normally occur to one skilled in the art to which the disclosure relates.

The foregoing description of the exemplary embodiments has been presented only for the purposes of illustration and description and is not intended to be exhaustive or to limit the systems and methods to the precise forms disclosed. Many modifications and variations are possible in light of the above teaching.

The embodiments were chosen and described in order to explain the principles of the systems and methods and their practical application so as to enable others skilled in the art to utilize the systems and methods and various embodiments and with various modifications as are suited to the particular use contemplated. Alternative embodiments will become apparent to those skilled in the art to which the present systems and methods pertain without departing from their spirit and scope. Accordingly, the scope of the present systems and methods is defined by the appended claims rather than the foregoing description and the exemplary embodiments described therein.

From the foregoing, it will be understood that various aspects of the processes described herein are software processes that execute on computer systems that form parts of the system. Accordingly, it will be understood that various embodiments of the system described herein are generally implemented as specially-configured computers including various computer hardware components and, in many cases, significant additional features as compared to conventional or known computers, processes, or the like, as discussed in greater detail herein. Embodiments within the scope of the present disclosure also include computer-readable media for carrying or having computer-executable instructions or data structures stored thereon. Such computer-readable media can be any available media which can be accessed by a computer, or downloadable through communication networks. By way of example, and not limitation, such computer-readable media can comprise various forms of data storage devices or media such as RAM, ROM, flash memory, EEPROM, CD-ROM, DVD, or other optical disk storage, magnetic disk storage, solid state drives (SSDs) or other data storage devices, any type of removable nonvolatile memories such as secure digital (SD), flash memory, memory stick, etc., or any other medium which can be used to carry or store computer program code in the form of computer-executable instructions or data structures and which can be accessed by a computer.

When information is transferred or provided over a network or another communications connection (either hardwired, wireless, or a combination of hardwired or wireless) to a computer, the computer properly views the connection as a computer-readable medium. Thus, any such a connection is properly termed and considered a computer-readable medium. Combinations of the above should also be included within the scope of computer-readable media. Computer-executable instructions comprise, for example, instructions and data which cause a computer to perform one specific function or a group of functions.

Those skilled in the art will understand the features and aspects of a suitable computing environment in which aspects of the disclosure may be implemented. Although not required, some of the embodiments of the claimed systems and methods may be described in the context of computer-executable instructions, such as program modules or engines, as described earlier, being executed by computers in networked environments. Such program modules are often reflected and illustrated by flow charts, sequence diagrams, exemplary screen displays, and other techniques used by those skilled in the art to communicate how to make and use such computer program modules. Generally, program modules include routines, programs, functions, objects, components, data structures, application programming interface (API) calls to other computers whether local or remote, etc. that perform particular tasks or implement particular defined data types, within the computer. Computer-executable instructions, associated data structures and/or schemas, and program modules represent examples of the program code for executing steps of the methods disclosed herein. The particular sequence of such executable instructions or associated data structures represent examples of corresponding acts for implementing the functions described in such steps.

Those skilled in the art will also appreciate that the claimed and/or described systems and methods may be practiced in network computing environments with many types of computer system configurations, including personal computers, smartphones, tablets, hand-held devices, multi-processor systems, microprocessor-based or programmable consumer electronics, networked PCs, minicomputers, mainframe computers, and the like. Embodiments of the claimed systems and methods are practiced in distributed computing environments where tasks are performed by local and remote processing devices that are linked (either by hardwired links, wireless links, or by a combination of hardwired or wireless links) through a communications network. In a distributed computing environment, program modules may be located in both local and remote memory storage devices.

An exemplary system for implementing various aspects of the described operations, which is not illustrated, includes a computing device including a processing unit, a system memory, and a system bus that couples various system components including the system memory to the processing unit. The computer will typically include one or more data storage devices for reading data from and writing data to. The data storage devices provide nonvolatile storage of computer-executable instructions, data structures, program modules, and other data for the computer.

Computer program code that implements the functionality described herein typically comprises one or more program modules that may be stored on a data storage device. This program code, as is known to those skilled in the art, usually includes an operating system, one or more application programs, other program modules, and program data. A user may enter commands and information into the computer through keyboard, touch screen, pointing device, a script containing computer program code written in a scripting language or other input devices (not shown), such as a microphone, etc. These and other input devices are often connected to the processing unit through known electrical, optical, or wireless connections.

The computer that effects many aspects of the described processes will typically operate in a networked environment using logical connections to one or more remote computers or data sources, which are described further below. Remote computers may be another personal computer, a server, a router, a network PC, a peer device or other common network node, and typically include many or all of the elements described above relative to the main computer system in which the systems and methods are embodied. The logical connections between computers include a local area network (LAN), a wide area network (WAN), virtual networks (WAN or LAN), and wireless LANs (WLAN) that are presented here by way of example and not limitation. Such networking environments are commonplace in office-wide or enterprise-wide computer networks, intranets, and the Internet.

When used in a LAN or WLAN networking environment, a computer system implementing aspects of the systems and methods is connected to the local network through a network interface or adapter. When used in a WAN or WLAN networking environment, the computer may include a modem, a wireless link, or other mechanisms for establishing communications over the wide area network, such as the Internet. In a networked environment, program modules depicted relative to the computer, or portions thereof, may be stored in a remote data storage device. It will be appreciated that the network connections described or shown are exemplary and other mechanisms of establishing communications over wide area networks or the Internet may be used.

While various aspects have been described in the context of a preferred embodiment, additional aspects, features, and methodologies of the claimed systems and methods will be readily discernible from the description herein, by those of ordinary skill in the art. Many embodiments and adaptations of the disclosure and claimed systems and methods other than those herein described, as well as many variations, modifications, and equivalent arrangements and methodologies, will be apparent from or reasonably suggested by the disclosure and the foregoing description thereof, without departing from the substance or scope of the claims. Furthermore, any sequence(s) and/or temporal order of steps of various processes described and claimed herein are those considered to be the best mode contemplated for carrying out the claimed systems and methods. It should also be understood that, although steps of various processes may be shown and described as being in a preferred sequence or temporal order, the steps of any such processes are not limited to being carried out in any particular sequence or order, absent a specific indication of such to achieve a particular intended result. In most cases, the steps of such processes may be carried out in a variety of different sequences and orders, while still falling within the scope of the claimed systems and methods. In addition, some steps may be carried out simultaneously, contemporaneously, or in synchronization with other steps.

The embodiments were chosen and described in order to explain the principles of the claimed systems and methods and their practical application so as to enable others skilled in the art to utilize the systems and methods and various embodiments and with various modifications as are suited to the particular use contemplated. Alternative embodiments will become apparent to those skilled in the art to which the claimed systems and methods pertain without departing from their spirit and scope. Accordingly, the scope of the claimed systems and methods is defined by the appended claims rather than the foregoing description and the exemplary embodiments described therein.

What is claimed is:

1. A method for biometric enrollment comprising:
   receiving a request to generate a unique representation of a subject;
   receiving at least one probe template associated with the subject;
   generating a cohort set based on a plurality of templates from a sample population;
   performing a one-to-many comparison process on the at least one probe template and the cohort set to generate one or more cohort vectors;
   normalizing the one or more cohort vectors;
   applying a lossy transformation to the one or more normalized cohort vectors to generate one or more transformed, privacy-secured (TPS) templates; and
   performing an enrollment process for the subject comprising storing the one or more TPS templates as the unique representation of the subject in one or more registries.

2. The method of claim 1, wherein the sample population excludes a target population comprising the subject.

3. The method of claim 1, wherein the sample population comprises artificial templates.

4. The method of claim 3, further comprising generating the artificial templates based on a pseudo-random noise vector.

5. The method of claim 1, further comprising:
   computing a discrimination ratio for each of the plurality of templates;
   ranking the plurality of templates based on the discrimination ratios; and
   generating the cohort set by selecting a subset of top-ranked templates from the sample population.

6. The method of claim 5, wherein the discrimination ratio is a ratio of in-class variance to between class variance.

7. The method of claim 6, wherein:
the discrimination ratio is defined by:

$$c = \frac{E_u[(\mu_u^c - \mu^c)^2]}{E_u(E_{y \in Y_u^c}[(y - \mu_u^c)^2])};$$

and
c is the discrimination ratio of the template, u is the subject, $\mu^c$ is a global mean cohort value, $\mu_u^c$ is a mean cohort value due based on comparing all of the subject u's samples to cohort sample c, Y is a matrix of cohort scores from the one-to-many comparison process, $E_u[\bullet]$ is an expectation operator over the plurality of templates, and $E_{y \in Y_u^c}[\bullet]$ is an expectation operator over the plurality of templates based on comparing all of the subject u's samples to cohort sample c.

8. The method of claim 1, wherein the lossy transformation is an Evergreen hash transformation.

9. The method of claim 1, further comprising:
   retrieving the one or more TPS templates from the one or more registries based on an identifier;
   performing a one-to-one comparison between a TPS probe template associated with the subject and the one or more TPS templates;
   based on the one-to-one comparison, determining that the TPS probe template matches the one or more TPS templates; and
   based on the determination, verifying an identity of the subject.

10. The method of claim 9, wherein:
    an output of the one-to-one comparison comprises at least one distance score; and
    determining that the TPS probe template matches the one or more TPS templates comprises determining that the at least one distance score meets a predefined distance threshold.

11. The method of claim 9, further comprising causing a lock to disengage.

12. The method of claim 9, further comprising providing access to a computing environment.

13. A biometric enrollment system comprising:
    one or more registries; and
    a processor in communication with the one or more registries and configured to:
      receive a request to generate a unique representation of a subject;
      receive at least one probe template associated with the subject;
      generate a cohort set based on a plurality of templates from a sample population;
      perform a one-to-many comparison process on the at least one probe template and the cohort set to generate one or more cohort vectors;
      normalize the one or more cohort vectors;
      apply a lossy transformation to the one or more normalized cohort vectors to generate one or more transformed, privacy-secured (TPS) templates; and
      perform an enrollment process for the subject comprising storing the one or more TPS templates as the unique representation of the subject in the one or more registries.

14. The system of claim 13, wherein the one or more TPS templates are computationally irreversible.

15. A non-transitory, computer-readable medium having instructions stored thereon that, when executed by a computer, cause the computer to:
- receive a request to generate a unique representation of a subject;
- receive at least one probe template associated with the subject;
- generate a cohort set based on a plurality of templates from a sample population;
- perform a one-to-many comparison process on the at least one probe template and the cohort set to generate one or more cohort vectors;
- normalize the one or more cohort vectors;
- apply a lossy transformation to the one or more normalized cohort vectors to generate one or more transformed, privacy-secured (TPS) templates; and
- perform an enrollment process for the subject comprising storing the one or more TPS templates as the unique representation of the subject in the one or more registries.

* * * * *